(12) United States Patent
Cautis et al.

(10) Patent No.: US 11,281,426 B2
(45) Date of Patent: Mar. 22, 2022

(54) APPLICATION PROGRAM SORTING METHOD AND APPARATUS

(71) Applicant: HUAWEI TECHNOLOGIES CO., LTD., Guangdong (CN)

(72) Inventors: Bogdan Cautis, Shenzen (CN); Ruiming Tang, Shenzhen (CN); Zhenhua Dong, Shenzhen (CN); Xiuqiang He, Shenzhen (CN); Zhirong Liu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 352 days.

(21) Appl. No.: 16/455,152

(22) Filed: Jun. 27, 2019

(65) Prior Publication Data
US 2019/0317729 A1     Oct. 17, 2019

Related U.S. Application Data

(63) Continuation of application No. PCT/CN2017/113213, filed on Nov. 27, 2017.

(30) Foreign Application Priority Data

Dec. 30, 2016   (CN) .......................... 201611259915.X

(51) Int. Cl.
  G06F 7/24      (2006.01)
  G06F 3/0482   (2013.01)
  G06F 17/18    (2006.01)

(52) U.S. Cl.
  CPC .............. *G06F 7/24* (2013.01); *G06F 3/0482* (2013.01); *G06F 17/18* (2013.01)

(58) Field of Classification Search
  CPC ........... G06F 7/24; G06F 17/18; G06F 16/435
  (Continued)

(56) References Cited

U.S. PATENT DOCUMENTS

2010/0030764 A1*  2/2010  Koren ................... G06F 16/435
                                                                 705/7.29
2016/0232164 A1    8/2016  Procopio et al.
(Continued)

FOREIGN PATENT DOCUMENTS

CN          101959179 A         1/2011
CN          102654860 A         9/2012
(Continued)

OTHER PUBLICATIONS

Hao Ma et al. User Fatigue in Online News Recommendation, WWW 2016, Apr. 11-15, 2016, pp. 1363-1372.
(Continued)

*Primary Examiner* — Baoquoc N To
(74) *Attorney, Agent, or Firm* — Womble Bond Dickinson (US) LLP

(57) ABSTRACT

An application sorting method and apparatus are provided. The method includes: obtaining, a positive operation probability and positive operation feedback information of each of at least two data samples; calculating an uncertainty parameter of a positive operation probability of a first data sample based on the positive operation probabilities and the positive operation feedback information of the at least two data samples and feature indication information of at least one same feature in a plurality of features in the at least two data samples; and correcting the positive operation probability of the first data sample by using the uncertainty parameter of the positive operation probability; and sorting, based on corrected positive operation probabilities, application programs corresponding to the at least two data samples.

19 Claims, 11 Drawing Sheets

(58) Field of Classification Search
USPC .......................................................... 707/754
See application file for complete search history.

(56) References Cited

U.S. PATENT DOCUMENTS

2016/0360336 A1* 12/2016 Gross ................ H04M 1/72403
2016/0360382 A1* 12/2016 Gross ...................... G06F 9/445
2019/0026344 A1     1/2019 Liu

FOREIGN PATENT DOCUMENTS

| CN | 104603753 A | 5/2015 |
| CN | 106227844 A | 12/2016 |
| CN | 106250532 A | 12/2016 |

OTHER PUBLICATIONS

Deepak Agarwal et al. Spatio-Temporal Models for Estimating Click-through Rate, WWW 2009, Apr. 20-24, 2009, total 10 pages.
Neal Lathia et al. Temporal Diversity in Recommender Systems, SIGIR'10, Jul. 19-23, 2010, pp. 210-217.
Pei Li et al. Modeling Impression Discounting in Large-scale Recommender Systems, KDD '14, Aug. 24-27, 2014, pp. 1837-1846.
Oren Sar Shalom et al. Beyond Collaborative Filtering: The List Recommendation Problem, WWW 2016, Apr. 11-15, 2016, pp. 63-72.

* cited by examiner

APPLICATION PROGRAM SORTING METHOD AND APPARATUS

CROSS-REFERENCE TO RELATED APPLICATIONS

This application is a continuation of International Application No. PCT/CN2017/113213, filed on Nov. 27, 2017, which claims priority to Chinese Patent Application No. 201611259915.X, filed on Dec. 30, 2016. The disclosures of the aforementioned applications are hereby incorporated by reference in their entireties.

TECHNICAL FIELD

This application relates to the field of electronic technologies, and in particular, to an application program sorting method and apparatus.

BACKGROUND

As terminal devices (such as smartphones and tablet computers) are popularized, increasingly more application programs can be installed on a terminal device to provide different services for a user. An application recommendation server may push an application program to a terminal device, and the terminal device displays, by using an application recommendation interface, the application program recommended by the application recommendation server.

A sequence of an application program in the application recommendation interface is crucial for whether a user performs a positive operation on the application program. For example, the user is more likely to download an application program displayed at a higher display position in the application recommendation interface. The positive operation performed by the user on the application program may be an operation such as tapping, downloading, or payment that can reflect a will of the user to use the application program.

In the prior art, the following operations may be performed on each application program: calculating a ratio of a quantity of forward operations performed on the application program to a total quantity of forward operations (namely, a quantity of forward operations performed on all the application programs), to obtain a positive operation probability of the application program; and then sorting all the application programs based on the positive operation probabilities of all the application programs.

However, "whether a user performs a positive operation on an application program" is affected by many factors. In the prior art, the positive operation probability obtained through calculation based on the quantity of forward operations performed on the application program and the total quantity of forward operations is inaccurate. After the application programs are sorted based on the inaccurate positive operation probabilities, a sorting sequence of the application program cannot accurately reflect a possibility that the user performs a positive operation on the application program.

SUMMARY

An application program sorting method and apparatus are disclosed to improve accuracy of a positive operation probability, which can more accurately reflect a possibility that a user performs a positive operation on an application program.

To achieve the foregoing objective, the following technical solutions are disclosed.

According to a first aspect, an application program sorting method, and the application program sorting method includes: obtaining a positive operation probability and positive operation feedback information of each of at least two data samples, where the data sample corresponds to one user and one application program, the data sample includes feature indication information of a plurality of features, the plurality of features in the data sample are respectively the same as a plurality of features in another data sample, the another data sample is any one of the at least two data samples except the data sample, the positive operation probability of the data sample is a probability that the user performs a positive operation on the application program in a preset time period, and the positive operation feedback information of the data sample is used to indicate whether the user has performed a positive operation on the application program in the preset time period; performing the following operations on each of the at least two data samples: calculating an uncertainty parameter of a positive operation probability of a first data sample based on the positive operation probabilities of the at least two data samples, the positive operation feedback information of the at least two data samples, and feature indication information of at least one same feature in a plurality of features in the at least two data samples; and correcting the positive operation probability of the first data sample by using the uncertainty parameter of the positive operation probability of the first data sample, to obtain a corrected positive operation probability of the first data sample, where the first data sample is any one of the at least two data samples; and sorting, based on corrected positive operation probabilities of the at least two data samples, all application programs corresponding to the at least two data samples.

The data sample corresponds to one user and one application program, and the data sample includes the feature indication information of the plurality of features. The plurality of features in the data sample may include indication information of each of at least three features, the at least three features include at least one feature of the user, at least one feature of the application program, and a feature of at least one scenario, and the at least one scenario is a scenario in which the user operates the application program. The plurality of features in the data sample are respectively the same as the plurality of features in the another data sample, and the another data sample is any one of the at least two data samples except the data sample. For example, each of the at least two data samples may include the at least three features. The positive operation probability of the data sample is the probability that the user corresponding to the data sample performs a positive operation on the application program in the preset time period. The positive operation feedback information of the data sample is used to indicate whether the user corresponding to the data sample has performed a positive operation on the application program in the preset time period. Duration of the preset time period may be preset. The feature of the at least one scenario may be environmental parameters, such as time, a position, and weather in which the user operates the application program, that may affect "whether the user performs a positive operation on the application program".

In this solution, the uncertainty parameter of the positive operation probability of each data sample may be calculated based on the positive operation probabilities of the at least two data samples, the positive operation feedback information of the at least two data samples, and the feature indication information of the at least one same feature in the plurality of features in the at least two data samples, and the positive operation probability of the data sample is then corrected by using the uncertainty parameter of each positive operation probability, to obtain the corrected positive operation probability of the data sample. Compared with the uncorrected positive operation probability, the corrected positive operation probability can more accurately reflect the possibility that the user performs a positive operation on the application program. Therefore, compared with an application program sorting result obtained after the application programs are sorted by using the uncorrected positive operation probabilities, an application program sorting result obtained after all the application programs corresponding to the at least two data samples are sorted based on the corrected positive operation probabilities of the at least two data samples can increase the possibility that the user performs a positive operation on the application program.

In an implementation of the first aspect, considering that in addition to the positive operation probability, factors affecting "whether the user performs a positive operation on the application program" may include a display position at which the application program is located in an application recommendation interface of a terminal device, a user attention degree of the display position is used to represent the possibility that the user performs a positive operation on the application program displayed at the display position. When the application program is displayed at different display positions, possibilities of performing a positive operation on the application program are different. For example, when a same application program is separately displayed at a higher display position and a lower display position, the user is usually more likely to perform a positive operation on the application program at the higher display position. In other words, both uncertainties of positive operation probabilities and display positions at which application programs are located in the application recommendation interface of the terminal device affect accuracy of sorting the application programs by an application recommendation server. To further improve accuracy of sorting the application programs by the application recommendation server, when correcting the positive operation probability based on the uncertainty parameter of the positive operation probability is considered, the positive operation probability may be further corrected based on a user attention degree of each display position. Specifically, the "correcting the positive operation probability of the first data sample by using the uncertainty parameter of the positive operation probability of the first data sample, to obtain a corrected positive operation probability of the first data sample" may include: correcting the positive operation probability of the first data sample by using the uncertainty parameter of the positive operation probability of the first data sample and the user attention degree of each display position, to obtain the corrected positive operation probability of the first data sample.

In an implementation of the first aspect, the "calculating an uncertainty parameter of a positive operation probability of a first data sample based on the positive operation probabilities of the at least two data samples, the positive operation feedback information of the at least two data samples, and feature indication information of at least one same feature in a plurality of features in the at least two data samples" may include: performing the following operation on each of the at least one same feature: calculating a weight of a first same feature based on the positive operation probabilities of the at least two data samples, the positive operation feedback information of the at least two data samples, and feature indication information of the first same feature in each of the at least two data samples, where the first same feature is any one of the at least one same feature; and calculating the uncertainty parameter of the positive operation probability of the first data sample based on a weight of the at least one same feature and the feature indication information of the at least one same feature included in the first data sample.

It should be noted that a weight of any same feature in the at least two data samples may be obtained based on a quantity of data samples that are in all the data samples and in which indication information of the same feature is 1, the positive operation probability of each data sample, and the positive operation feedback information of each data sample. When the feature indication information of any same feature is 0, it indicates that the same feature has no impact on "whether the user performs a positive operation on the application program". Alternatively, when the feature indication information of any same feature is 1, it indicates that the same feature may "whether the user performs a positive operation on the application program". For example, a larger quantity of forward data samples (data samples whose positive operation feedback information is 1) that are in forward data samples in the at least two data samples and in which the feature indication information of any same feature is 1 indicates a higher weight of the same feature, thereby indicating a greater impact of the same feature on "whether the user performs a positive operation on the application program".

In an implementation of the first aspect, the at least one same feature includes all features in the at least two data samples, and the first same feature is any one of the at least one same feature. The "calculating a weight of a first same feature based on the positive operation probabilities of the at least two data samples, the positive operation feedback information of the at least two data samples, and feature indication information of the first same feature in each of the at least two data samples" may include:

calculating a weight $n_k$ of a $k^{th}$ Same feature in the at least two data samples by using $$n_k = \sum_{j=1}^{n} \sum_{i=1}^{m} ((P_{(i,j)} - y_{(i,j)}) \times a_{(i,j)-k})^2,$$

where $k \in \{1, 2, \ldots, q\}$, is used to represent a quantity of features in $X_{(i,j)}$, and $q \geq 3$, where $X_{(i,j)}$ is used to represent a data sample corresponding to a user i and an application program j, $i \in \{1, 2, \ldots, m\}$, m is used to represent a quantity of users, $m \geq 2$, $j \in \{1, 2, \ldots, n\}$, n is used to represent a quantity of application programs, and $n \geq 2$; $P_{(i,j)}$ is used to represent a positive operation probability of $X_{(i,j)}$ and $y_{(i,j)}$ is used to represent positive operation feedback information of $X_{(i,j)}$; and $a_{(i,j)-k}$ is used to represent feature indication information of the $k^{th}$ same feature $x_{(i,j)-k}$ in $X_{(i,j)}$.

A smaller difference between the positive operation probability and the positive operation feedback information of any one of the at least two data samples indicates a more accurate positive operation probability of the data sample. When the feature indication information $a_{(i,j)-k}$ of the $k^{th}$ same feature $x_{(i,j)-k}$ in the data sample $X_{(i,j)}$ is 0, it indicates that the $k^{th}$ same feature has no impact on the positive operation probability $P_{(i,j)}$ of the data sample $X_{(i,j)}$. $(P_{(i,j)} - y_{(i,j)}) \times a_{(i,j)-k}$ is 0, that is, the $k^{th}$ same feature $x_{(i,j)-k}$ has no impact on the weight of $x_{(i,j)-k}$. When the feature indication information $a_{(i,j)\text{-}k}$ of the $k^{th}$ same feature $x_{(i,j)\text{-}k}$ in the data sample $X_{(i,j)}$ is 1, the weight of $x_{(i,j)\text{-}k}$ may be calculated based on a difference (that is, a difference $P_{(i,j)}-y_{(i,j)}$ between $P_{(i,j)}$ and $y_{(i,j)}$) between the positive operation probability $P_{(i,j)}$ and the positive operation feedback information $y_{(i,j)}$ of the data sample $X_{(i,j)}$. For example, the positive operation probability $P_{(i,j)}$ is obtained through calculation, and the positive operation feedback information $y_{(i,j)}$ is a real value. Therefore, a smaller difference $P_{(i,j)}-y_{(i,j)}$ between the positive operation probability $P_{(i,j)}$ and the positive operation feedback information $y_{(i,j)}$ of the data sample $X_{(i,j)}$ indicates a more accurate positive operation probability $P_{(i,j)}$ of the data sample. In this case, the positive operation probability has a smaller impact on the weight $n_k$ of the $k^{th}$ same feature $x_{(i,j)\text{-}k}$ in the data sample $X_{(i,j)}$ and therefore the weight $n_k$ of the $k^{th}$ same feature $x_{(i,j)\text{-}k}$ is lower in all the data samples.

In an implementation of the first aspect, the at least one same feature includes all the features in the at least two data samples; and the calculating the uncertainty parameter of the positive operation probability of the first data sample based on a weight of the at least one same feature and the feature indication information of the at least one same feature included in the first data sample may include:

calculating an uncertainty parameter $uc_{(i,j)}$ of the positive operation probability of the data sample $X_{(i,j)}$ by using $$u_{(i,j)} = \sum_{k=1}^{q} \frac{a_{(i,j)\text{-}k}}{\sqrt{n_k}},$$

where the first data sample is the data sample $X_{(i,j)}$ of the user i and the application program j, $i\in\{1, 2, \ldots, m\}$, m is used to represent the quantity of users, $m\geq 2$, $j\in\{1, 2, \ldots, n\}$, n is used to represent the quantity of application programs, and $n\geq 2$; $k\in\{1, 2, \ldots, q\}$, q is used to represent the quantity of features in $X_{(i,j)}$ and $q\leq 3$; $n_k$ is used to represent the weight of the $k^{th}$ same feature in $X_{(i,j)}$; and $a_{(i,j)\text{-}k}$ is used to represent the feature indication information of the $k^{th}$ same feature $x_{(i,j)\text{-}k}$ in $X_{(i,j)}$.

When the feature indication information $a_{(i,j)\text{-}k}$ of the $k^{th}$ same feature $x_{(i,j)\text{-}k}$ in the data sample $X_{(i,j)}$ is 0, the $k^{th}$ same feature $x_{(i,j)\text{-}k}$ has no impact the uncertainty parameter $uc_{(i,j)}$ of the positive operation probability of the data sample $X_{(i,j)}$. When the feature indication information $a_{(i,j)\text{-}k}$ of the $k^{th}$ same feature $x_{(i,j)\text{-}k}$ in the data sample $X_{(i,j)}$ is 1, the $k^{th}$ same feature $x_{(i,j)\text{-}k}$ may affect the uncertainty parameter $uc_{(i,j)}$ of the positive operation probability of the data sample $X_{(i,j)}$. For example, when the feature indication information $a_{(i,j)\text{-}k}$ of the $k^{th}$ same feature $x_{(i,j)\text{-}k}$ in the data sample $X_{(i,j)}$ is 1, a higher weight $n_k$ of the $k^{th}$ same feature $x_{(i,j)\text{-}k}$ indicates a smaller uncertainty parameter $uc_{(i,j)}$ of the positive operation probability of the data sample $X_{(i,j)}$.

In an implementation of the first aspect, the uncertainty parameter of the positive operation probability of the first data sample may be further normalized in this application. For example, a method for "normalizing the uncertainty parameter of the positive operation probability of the first data sample" in this application is described herein by using an example in which the uncertainty parameter of the positive operation probability of the first data sample $X_{(i,j)}$ is normalized to a value ranging from 0 to 1. The method for normalizing the uncertainty parameter of the positive operation probability of the first data sample includes: if the uncertainty parameter $uc_{(i,j)}$ of the positive operation probability of the data sample $X_{(i,j)}$ is greater than or equal to 1, determining the uncertainty parameter of the positive operation probability of the data sample $X_{(i,j)}$ as 1; or if the uncertainty parameter $uc_{(i,j)}$ of the positive operation probability of the data sample $X_{(i,j)}$ is less than 1, determining that a normalized uncertainty parameter of the positive operation probability of the data sample $X_{(i,j)}$ is still $uc_{(i,j)}$. Alternatively, the uncertainty parameter of the positive operation probability of the data sample $X_{(i,j)}$ may be normalized by using $$uc_{(i,j)}^1 = \frac{uc_{(i,j)}}{\max\{uc\}},$$

to obtain a normalized uncertainty parameter $uc_{(i,j)}^1$ of the positive operation probability of the data sample $X_{(i,j)}$, where $\max\{uc\}$ is used to represent a maximum uncertainty parameter in uncertainty parameters of the positive operation probabilities of all the data samples. The first data sample is the data sample $X_{(i,j)}$ of the user i and the application program j, $i\in\{1, 2, \ldots, m\}$ m is used to represent the quantity of users, $m\geq 2$, $j\in\{1, 2, \ldots, n\}$ n is used to represent the quantity of application programs, and $n\geq 2$.

In an implementation of the first aspect, the correcting the positive operation probability of the first data sample by using the uncertainty parameter of the positive operation probability of the first data sample, to obtain a corrected positive operation probability of the first data sample may include:

correcting the positive operation probability $P_{(i,j)}$ of the data sample $X_{(i,j)}$ by using $P_{(i,j)}^1 = P_{(i,j)} \times uc_{(i,j)}$, to obtain a corrected positive operation probability $P_{(i,j)}^1$ of $X_{(i,j)}$, where the first data sample is the data sample $X_{(i,j)}$ of the user i and the application program j, $i\in\{1, 2, \ldots, m\}$, m is used to represent the quantity of users, $m\geq 2$, $j\in\{1, 2, \ldots, n\}$ n is used to represent the quantity of application programs, and $n\geq 2$; and $uc_{(i,j)}$ is used to represent the uncertainty parameter of the positive operation probability $P_{(i,j)}$ of $X_{(i,j)}$.

The positive operation probability $P_{(i,j)}$ that is of the data sample $X_{(i,j)}$ and that is obtained based on the at least two data samples and the positive operation feedback information corresponding to the at least two data samples is inaccurate. However, an uncertainty of the positive operation probability $P_{(i,j)}$ of the data sample $X_{(i,j)}$ may be corrected based on the uncertainty parameter $uc_{(i,j)}$ of the positive operation probability $P_{(i,j)}$ by using $P_{(i,j)} \times uc_{(i,j)}$ to obtain the corrected positive operation probability $P_{(i,j)}^1$ of the data sample $X_{(i,j)}$. For example, the uncertainty parameter $uc_{(i,j)}$ of the positive operation probability $P_{(i,j)}$ may be a normalized uncertainty parameter $uc_{(i,j)}^1$. For example, when the uncertainty parameter $uc_{(i,j)}$ of positive operation the positive operation probability is normalized to a value ranging from 0 to 1, a larger uncertainty parameter $uc_{(i,j)}^1$ indicates a larger corrected positive operation probability $P_{(i,j)}^1$. To be specific, a possibility that the user i in the data sample $X_{(i,j)}$ performs a positive operation on the application program j is larger. Therefore, if the application program j is sorted based on the corrected positive operation probability $P_{(i,j)}^1$, an obtained sorting position of the application program j ranks higher, and a display position of the application program j in the application recommendation interface also ranks higher.

In an implementation of the first aspect, the correcting the positive operation probability of the first data sample by using the uncertainty parameter of the positive operation probability of the first data sample and the user attention degree of each display position, to obtain the corrected positive operation probability of the first data sample may include:

correcting a positive operation probability $P_{(i,j)}$ of a data sample $X_{(i,j)}$ by using $P_{(i,j)}^{(l+1)} = P_{(i,j)} \times uc_{(i,j)}^B$ and $$B = \sum_{l=1}^{T} b\{pos(j, l)\},$$

to obtain a corrected positive operation probability $P_{(i,j)}^{(l+1)}$ of $X_{(i,j)}$, where the first data sample is the data sample $X_{(i,j)}$ of a user i and an application program j, $i \in \{1, 2, \ldots, m\}$, m is used to represent a quantity of users, $m \geq 2$, $j \in \{1, 2, \ldots, n\}$, n is used to represent a quantity of application programs, and $n \geq 2$; $uc_{(i,j)}$ is used to represent an uncertainty parameter of the positive operation probability $P_{(i,j)}$ of $X_{(i,j)}$, pos(j,l) is used to represent a display position at which the application program j is displayed for the $l^{th}$ time in the application recommendation interface; and b{pos(j,l)} is used to represent a user attention degree of the display position pos(j,l), $l \in \{1, 2, \ldots, T\}$, T is used to represent a quantity of times of displaying the application program j in the application recommendation interface, and $T \geq 1$.

The display position also affects the positive operation probability "whether the user performs a positive operation on the application program". A higher user attention degree of the display position indicates a higher probability that the user performs a positive operation on the application program recommended at the display position. The positive operation probability of the data sample is corrected by using the uncertainty parameter of the positive operation probability of each of the at least two data samples and with reference to a user attention degree of a display position at which the application program is displayed each time in the application recommendation interface, so that the positive operation probability can more accurately reflect the possibility that the user performs a positive operation on the application program. For example, when the uncertainty parameter $uc_{(i,j)}$ of the positive operation and the user attention degree b{pos(j,l)} of the display position pos(j,l) each are normalized to a value ranging from 0 to 1, and the positive operation probability $P_{(i,j)}$ is a value ranging from 0 to 1, a higher user attention degree b{pos(j,l)} of the display position pos(j,l) indicates a larger B, and therefore indicates a smaller $P_{(i,j)} \times (uc_{(i,j)})^B$ and a smaller corrected positive operation probability $P_{(i,j)}^{(l+1)}$ of the data sample. To be specific, the possibility that the user i in the data sample $X_{(i,j)}$ performs a positive operation on the application program j is smaller. Therefore, if the application program j is sorted based on the corrected positive operation probability $P_{(i,j)}^{(l+1)}$, an obtained sorting position of the application program j ranks lower, and a display position of the application program j in the application recommendation interface also ranks lower.

It should be noted that the corrected positive operation probability $P_{(i,j)}^{(l+1)}$ of the data sample is a possibility that the user i performs a positive operation on the application program j when the application program j is displayed at the display position for the $(l+1)^{th}$ time pos(j,l+1) in the application recommendation interface.

In an implementation of the first aspect, the sorting, based on corrected positive operation probabilities of the at least two data samples, all application programs corresponding to the at least two data samples may include: determining at least two second data samples from the at least two data samples, where each of the at least two second data samples corresponds to a first user and one application program; and sorting, based on corrected positive operation probabilities of the at least two second data samples, all application programs corresponding to the at least two second data samples, where a sorting result obtained after all the application programs corresponding to the at least two second data samples are sorted is used to recommend, to the first user, all the application programs corresponding to the at least two second data samples.

Because the at least two second data samples are data samples corresponding to the first user, all the application programs corresponding to the at least two second data samples are sorted for the first user by using a corrected positive operation probability of each of the at least two second data samples, so that an application program sorting result meeting a user preference of the first user may be obtained. That is, a possibility that the first user performs a positive operation on the application program displayed in the application recommendation interface of the terminal device of the first user is larger.

In an implementation of the first aspect, "calculating the user attention degree of each display position that is used to display the application program and that is in the application recommendation interface of the terminal device" may be implemented in the following two manners.

Manner 1: A quantity of forward operations performed in a time period on an application program displayed at each display position is obtained. The quantity of forward operations performed on the application program at each display position is used to represent the user attention degree of the display position.

Manner 2: A quantity of forward operations performed in a time period on an application program displayed at each display position is obtained, and a ratio of the quantity of forward operations performed on the application program displayed at each display position to a quantity of forward operations performed on an application program displayed at a first display position is calculated. A ratio of a quantity of forward operations performed on an application program displayed at any display position to the quantity of forward operations performed on the application program displayed at the first display position is used to represent the user attention degree of the display position. The first display position is a display position in the display positions, where a maximum quantity of forward operations are performed on an application program displayed at the display position.

The "obtained quantity of forward operations performed on the application program displayed at each display position" may be a quantity that is of forward operations performed on the application program displayed at each display position and that is obtained through statistics collection in a time period after the application program is displayed at each display position according to a random sorting result after the application programs are randomly sorted; or may be a quantity that is of forward operations performed on the application program displayed at each display position and that is obtained through statistics collection in a time period after the application program is displayed at each display position according to a sorting result after the application programs are sorted by using the application program sorting method provided in this application; or may be a quantity that is of forward operations performed on the application program displayed at each display position and that is obtained through statistics collection in a time period after the application program is displayed at each display position according to a sorting result after the application programs are sorted by using any other sorting method. The time period may be before the application recommendation server calculates the user attention degree of each display position, and duration of the time period may be preset.

It should be noted that the "obtained quantity of forward operations performed on the application program displayed at each display position" may be a quantity that is obtained through statistics collection and that is of forward operations performed by all users on the application program displayed at each display position; or may be a quantity that is obtained through statistics collection and that is of forward operations performed by a user randomly sampled from some users on the application program displayed at each display position, instead of a quantity of forward operations performed by a specific user on the application program displayed at each display position.

The "application program displayed at each display position" may be a same or different random application program. The "obtained quantity of forward operations performed on the application program displayed at each display position" may be a quantity that is obtained through statistics collection and that is of forward operations performed on a same application program displayed at each display position; or may be a quantity of forward operations performed on different application programs displayed at each display position, instead of a quantity that is obtained through statistics collection and that is of forward operations performed on a specific application program displayed at each display position.

In an implementation of the first aspect, "the obtaining, by an application recommendation server, a positive operation probability and positive operation feedback information of each of at least two data samples" may include: obtaining, by the application recommendation server, historical operation information of at least two application programs of each of at least two terminal devices, to obtain the at least two data samples and the positive operation feedback information of each of the at least two data samples; collecting statistics about the at least two data samples and the positive operation feedback information of each of the at least two data samples, to obtain positive operation proportion values of all features in the at least two data samples; and performing the following operation on each of the at least two data samples: calculating the positive operation probability of each data sample based on the positive operation proportion values of all the features in the at least two data samples.

The $k^{th}$ same feature $x_{(i,j)\text{-}k}$ is used as an example. A positive operation proportion value $W_k$ of the $k^{th}$ same feature $x_{(i,j)\text{-}k}$ may represent a degree of an impact of the $k^{th}$ same feature $X_{(i,j)\text{-}k}$ on "whether user i performs a positive operation on the application program j". A larger positive operation proportion value $w_k$ of $x_{(i,j)\text{-}k}$ indicates a greater impact of the $k^{th}$ same feature $x_{(i,j)\text{-}k}$ on "whether the user performs a positive operation on the application program".

According to a second aspect, this application provides an application program sorting apparatus, including an obtaining module, a calculation module, a correction module, and a sorting module. The obtaining module may be configured to obtain a positive operation probability and positive operation feedback information of each of at least two data samples, where each data sample corresponds to one user and one application program, the at least two data samples include indication information of a plurality of same features, the data sample includes feature indication information of a plurality of features, the plurality of features in the data sample are respectively the same as a plurality of features in another data sample, the another data sample is any one of the at least two data samples except the data sample, the positive operation probability of the data sample is a probability that the user corresponding to the data sample performs a positive operation on the application program in a preset time period, and the positive operation feedback information of the data sample is used to indicate whether the user has performed a positive operation on the application program in the preset time period. The calculation module may be configured to perform the following operation on each of the at least two data samples: calculating an uncertainty parameter of a positive operation probability of a first data sample based on the positive operation probabilities of the at least two data samples, the positive operation feedback information of the at least two data samples, and feature indication information of at least one same feature in a plurality of features in the at least two data samples, where the positive operation probabilities and the positive operation feedback information are obtained by the obtaining module, and the first data sample is any one of the at least two data samples. The correction module may be configured to perform the following operation on each of the at least two data samples: correcting the positive operation probability of the first data sample by using the uncertainty parameter that is of the positive operation probability of the first data sample and that is obtained through calculation by the calculation module, to obtain a corrected positive operation probability of the first data sample. The sorting module may be configured to sort, based on positive operation probabilities that are of the at least two data samples and that are obtained through correction by the correction module, all application programs corresponding to the at least two data samples.

In an implementation of the second aspect, the calculation module may be further configured to: before the correction module corrects the positive operation probability of the first data sample by using the uncertainty parameter that is of the positive operation probability of the first data sample and that is obtained through calculation by the calculation module, to obtain the corrected positive operation probability of the first data sample, calculate a user attention degree of each display position that is used to display an application program and that is in an application recommendation interface of a terminal device, where the user attention degree of the display position is used to represent a possibility that the user performs a positive operation on the application program displayed at the display position. The correction module may be specifically configured to correct the positive operation probability of the first data sample by using the uncertainty parameter that is of the positive operation probability of the first data sample and that is obtained through calculation by the calculation module and the user attention degree that is of each display position and that is obtained through calculation by the calculation module, to obtain the corrected positive operation probability of the first data sample.

In an implementation of the second aspect, the calculation module may include: a weight calculation submodule and an uncertainty parameter calculation submodule. The weight calculation submodule is configured to perform the following operation on each of the at least one same feature: calculating a weight of a first same feature based on the positive operation probabilities of the at least two data samples, the positive operation feedback information of the at least two data samples, and feature indication information of the first same feature in each of the at least two data samples, where the first same feature is any one of the at least one same feature. The uncertainty parameter calculation submodule is configured to perform the following operation on each of the at least two data samples: calculating the uncertainty parameter of the positive operation probability of the first data sample based on the feature indication information of the at least one same feature included in the first data sample and a weight that is of the at least one same feature and that is obtained through calculation by the weight calculation submodule.

In an implementation of the second aspect, the at least one same feature includes all features in the at least two data samples, and the weight calculation submodule may be specifically configured to:

calculate a weight $n_k$ of a $k^{th}$ same feature in the at least two data samples by using $$n_k = \sum_{j=1}^{n} \sum_{i=1}^{m} ((P_{(i,j)} - y_{(i,j)}) \times a_{(i,j)-k})^2,$$

where $k \in \{1, 2, \ldots, q\}$, q is used to represent a quantity of features in $X_{(i,j)}$, and $q \geq 3$, where $X_{(i,j)}$ is used to represent a data sample corresponding to a user i and an application program 1, $i \in \{1, 2, \ldots, m\}$, m is used to represent a quantity of users, $m \geq 2$, $j \in \{1, 2, \ldots, n\}$, n is used to represent a quantity of application programs, and $n \geq 2$; $P_{(i,j)}$ is used to represent a positive operation probability of $X_{(i,j)}$, and $y_{(i,j)}$ is used to represent positive operation feedback information of $X_{(i,j)}$; and $a_{(i,j)-k}$ is used to represent feature indication information of the $k^{th}$ same feature $x_{(i,j)-k}$ in $X_{(i,j)}$.

In an implementation of the second aspect, the uncertainty parameter calculation submodule may be specifically configured to:

calculate an uncertainty parameter $uc_{(i,j)}$ of the positive operation probability of the data sample $X_{(i,j)}$ by using $$uc_{(i,j)} = \sum_{k=1}^{q} \frac{a_{(i,j)-k}}{\sqrt{n_k}},$$

where the first data sample is the data sample $X_{(i,j)}$ of the user i and the application program j, $i \in \{1, 2, \ldots, m\}$, m is used to represent the quantity of users, $m \geq 2$, $j \in \{1, 2, \ldots, n\}$, n is used to represent the quantity of application programs, and $n \geq 2$; $k \in \{1, 2, \ldots, q\}$, q is used to represent the quantity of features in $X_{(i,j)}$ and $q \geq 3$: $n_k$ is used to represent the weight of the $k^{th}$ same feature in $X_{(i,j)}$; and $a_{(i,j)-k}$ is used to represent the feature indication information of the $k^{th}$ same feature $x_{(i,j)-k}$ in $X_{(i,j)}$.

In an implementation of the second aspect, the correction module may be specifically configured to correct the positive operation probability $P_{(i,j)}$ of the data sample $X_{(i,j)}$ by using $P_{(i,j)}^{1} = P_{(i,j)} \times uc_{(i,j)}$, to obtain a corrected positive operation probability $P_{(i,j)}^{1}$ of $X_{(i,j)}$, where the first data sample is the data sample $X_{(i,j)}$ of the user i and the application program j, $i \in \{1, 2, \ldots, m\}$, m is used to represent the quantity of users, $m \geq 2$, $j \in \{1, 2, \ldots, n\}$ n is used to represent the quantity of application programs, and $n \geq 2$; and $uc_{(i,j)}$ is used to represent the uncertainty parameter of the positive operation probability $P_{(i,j)}$ of $X_{(i,j)}$.

In an implementation of the second aspect, the correction module may be specifically configured to:

correct a positive operation probability $P_{(i,j)}$ of a data sample $X_{(i,j)}$ by using $P_{(i,j)}^{(l+1)} = P_{(i,j)} \times (uc_{(i,j)})^B$ and $$B = \sum_{l=1}^{T} b\{pos(j, l)\},$$

to obtain a corrected positive operation probability $P_{(i,j)}^{(l+1)}$ of $X_{(i,j)}$, where the first data sample is the data sample $X_{(i,j)}$ of a user i and an application program j, $i \in \{1, 2, \ldots, m\}$, m is used to represent a quantity of users, $m \geq 2$, $j \in \{1, 2, \ldots, n\}$, n is used to represent a quantity of application programs, and $n \geq 2$; $uc_{(i,j)}$ is used to represent an uncertainty parameter of the positive operation probability $P_{(i,j)}$ of $X_{(i,j)}$; pos(j,l) is used to represent a display position at which the application program j is displayed for the $l^{th}$ time in the application recommendation interface; and $b\{pos(j,l)\}$ is used to represent a user attention degree of the display position pos(j,l), $l \in \{1, 2, \ldots, T\}$, T is used to represent a quantity of times of displaying the application program j in the application recommendation interface, and $T \geq 1$.

In an implementation of the second aspect, the sorting module may be specifically configured to: determine at least two second data samples from the at least two data samples, where each of the at least two second data samples corresponds to a first user and one application program; and sort, based on corrected positive operation probabilities of the at least two second data samples, all application programs corresponding to the at least two second data samples. A sorting result obtained after all the application programs corresponding to the at least two second data samples are sorted is used to recommend, to the first user, all the application programs corresponding to the at least two second data samples.

In this solution, data samples, namely, at least two second data samples, corresponding to each user may be determined from the at least two data samples, and all application programs corresponding to the at least two second data samples are sorted based on corrected positive operation probabilities of the at least two second data samples corresponding to the user. In this way, an application program may be recommended to each user in a targeted manner according to a sorting result of the application programs corresponding to the user, so that the recommended application program better meets a preference of the user.

In an implementation of the second aspect, the obtaining module may be specifically configured to: obtain historical operation information of at least two application programs of each of at least two terminal devices, to obtain the at least two data samples and the positive operation feedback information of each of the at least two data samples; collect statistics about the at least two data samples and the positive operation feedback information of each of the at least two data samples, to obtain a positive operation proportion value of at least one same feature in a plurality of features in the at least two data samples; and perform the following operation on each of the at least two data samples: calculating the positive operation probability of the first data sample based on the positive operation proportion value of the at least one same feature in the plurality of features in the at least two data samples. The first data sample is any one of the at least two data samples.

In an implementation of the second aspect, the calculation module is specifically configured to obtain a quantity of times of forward operations performed in a time period on the application program displayed at each display position, where the quantity of forward operations performed on the application program at each display position is used to represent the user attention degree of the display position.

In an implementation of the second aspect, the calculation module is specifically configured to: obtain a quantity of forward operations performed in a time period on an application program displayed at each display position, and calculate a ratio of the quantity of forward operations performed on the application program displayed at each display position to a quantity of forward operations performed on an application program displayed at a first display position. A ratio of a quantity of forward operations performed on an application program displayed at any display position to the quantity of forward operations performed on the application program displayed at the first display position is used to represent the user attention degree of the display position. The first display position is a display position in the display positions, where a maximum quantity of forward operations are performed on an application program displayed at the display position.

According to a third aspect, an application program sorting apparatus, and the application program sorting apparatus includes a processor, a memory, a bus, and a communications interface. The processor, the memory, and the communications interface are connected by using the bus. The memory is configured to store computer program code, the computer program code includes an instruction, and when the processor of the application program sorting apparatus executes the instruction, the application program sorting apparatus performs the application program sorting method in the first aspect and the implementations of the first aspect.

According to a fourth aspect, a computer storage medium is provided. The computer storage medium stores computer program code, the computer program code includes an instruction, and when the processor of the application program sorting apparatus in the third aspect executes the instruction, the application program sorting apparatus performs application program sorting method in the first aspect and the possible implementations of the first aspect.

It should be noted that the processor in the third aspect of this application may be integration of function modules such as the obtaining module, the calculation module, the correction module, and the sorting module in the second aspect, and the processor may implement functions of the function modules in the second aspect. For detailed descriptions of the modules in the second aspect and the third aspect and analysis of beneficial effects, refer to corresponding descriptions and technical effects in the first aspect and the possible implementations of the first aspect. Details are not described herein again.

DESCRIPTION OF EMBODIMENTS

Figure 1:
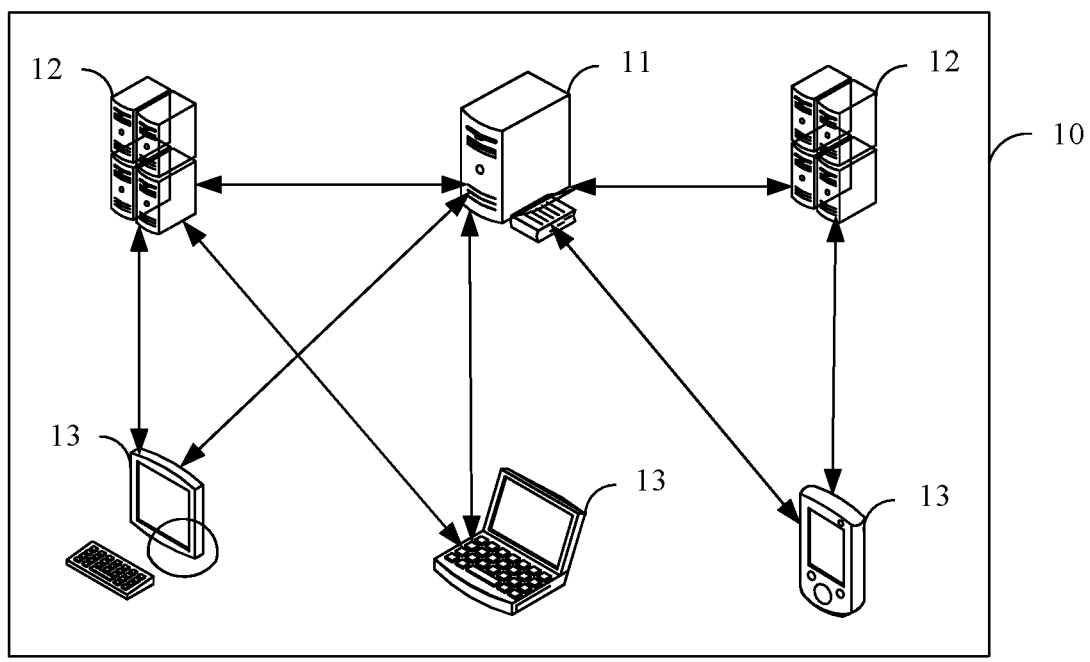
FIG. 1 is a schematic diagram of a network architecture of an application program recommendation system according to an embodiment of the present invention.

An application program sorting method and apparatus are provided in the following embodiments, which can be applied to an application program recommendation process, and is specifically applied to an application program sorting process before an application program is recommended.

Terms in the embodiments of the present invention are described below.

An "application program recommendation interface" may be a display interface of a terminal device, that is used to display an application program and that displays software such as an application market installed on the terminal device.

A "forward operation" may be specifically an operation that can reflect a will of a user to use an application program. For example, the "forward operation" may be an operation such as tapping, downloading, and payment. A "non-forward operation" may be an operation such as browsing.

A "data sample" may be a set of information, on a terminal device, related to an operation performed by a user on an application program.

For example, each of at least two data samples corresponds to one user and one application program. The data sample includes feature indication information of a plurality of features, and the plurality of features may be at least three features. For example, the at least three features include at least one feature of the user, least one feature of the application program, and a feature of at least one scenario.

The at least one feature of the user may include a gender, an age, or the like of the user. The at least one feature of the application program may be a type of the application program, an icon (such as an icon color or an icon shape) of the application program, or the like. The feature of the at least one scenario may be environmental parameters, such as time, a position, and weather in which the user operates the application program, that may affect "whether the user performs a positive operation on the application program".

For example, in the disclosed embodiments, a data sample corresponding to a user i and an application program j may be represented by using $X_{(i,j)}$, $i \in \{1, 2, \ldots, m\}$, m is used to represent a quantity of users, $m \geq 2$, $j \in \{1, 2, \ldots, n\}$, n is used to represent a quantity of application programs, and $n \geq 2$. Feature indication information of a $k^{th}$ same feature $x_{(i,j)\text{-}k}$ in $X_{(i,j)}$ may be represented by using $a_{(i,j)\text{-}k}$, $k \in \{1, 2, \ldots, q\}$, q is used to represent a quantity of features in $X_{(i,j)}$, and $q \geq 3$.

Specifically, the data sample $X_{(i,j)} = \{x_{1(i,j)}, x_{2(i,j)}, x_{3(i,j)}\}$, where $x_{1(i,j)}$ is used to represent a feature of the user i, $x_{2(i,j)}$ is used to represent a feature of the application program j, and $x_{3(i,j)}$ is used to represent a scenario in which the user i operates the application program j. For example, it is assumed that the at least one feature of the user included in the data sample may include a hair color, a gender, and an age group of the user; the at least one feature of the application program may include an icon color and a type of the application program; the feature of the at least one scenario may include time, weather, or the like in which the user performs a positive operation or a non-positive operation on the application program.

For example, the hair color may include black, yellow, and white; the gender includes male and female; and the age group may be the juvenile, the young, or the aged. The icon color of the application program may be blue or red, and the type of the application program may be a social type, a game type, or an office type. The time when the user performs a positive operation or a non-positive operation on the application program may be in the morning, in the afternoon, or in the evening.

It is assumed that the feature $x_{1(i,j)}$ of the user i in the data sample $X_{(i,j)}$ may include eight features: $x_{(i,j)\text{-}1}$, $x_{(i,j)\text{-}2}$, $x_{(i,j)\text{-}3}$, $x_{(i,j)\text{-}4}$, $x_{(i,j)\text{-}5}$, $x_{(i,j)\text{-}6}$, $x_{(i,j)\text{-}7}$, and $x_{(i,j)\text{-}8}$; the feature $x_{2(i,j)}$ of the application program j may include five features: $x_{(i,j)\text{-}9}$, $x_{(i,j)\text{-}10}$, $x_{(i,j)\text{-}11}$, $x_{(i,j)\text{-}12}$, and $x_{(i,j)\text{-}13}$; and the scenario $x_{3(i,j)}$ in which the user i operates the application program j may include three features: $x_{(i,j)\text{-}14}$, $x_{(i,j)\text{-}15}$, and $x_{(i,j)\text{-}16}$.

$x_{(i,j)\text{-}1}$ represents "whether the user i has black hair", $x_{(i,j)\text{-}2}$ represents "whether the user i has yellow hair", $x_{(i,j)\text{-}3}$ represents "whether the user i has white hair", $x_{(i,j)\text{-}4}$ represents "whether the user i is male", $x_{(i,j)\text{-}5}$ represents "whether the user i is female", $x_{(i,j)\text{-}6}$ represents "whether the user i is juvenile", $x_{(i,j)\text{-}7}$ represents "whether the user i is young", and $x_{(i,j)\text{-}8}$ represents "whether the user i is aged".

$x_{(i,j)\text{-}9}$ represents "whether the icon of the application program j is blue", $x_{(i,j)\text{-}10}$ represents "whether the icon of the application program j is red", $x_{(i,j)\text{-}11}$ represents "whether the application program j is a social-type application program", $x_{(i,j)\text{-}12}$ represents "whether the application program j is a game-type application program", and $x_{(i,j)\text{-}13}$ represents "whether the application program j is an office-type application program".

$x_{(i,j)\text{-}14}$ represents "whether the time when the user i operates the application program j is in the morning", $x_{(i,j)\text{-}15}$ represents "whether the time when the i operates the application program j is in the afternoon", and $x_{(i,j)\text{-}16}$ represents "whether the time when the user i operates the application program j is in the evening".

The features $x_{(i,j)\text{-}1}$, $x_{(i,j)\text{-}2}$, $x_{(i,j)\text{-}3}$, $\ldots$, $x_{(i,j)\text{-}15}$, and $x_{(i,j)\text{-}16}$ respectively correspond to feature indication information $a_{(i,j)\text{-}1}$, $a_{(i,j)\text{-}2}$, $\ldots$, $a_{(i,j)\text{-}15}$, and. The feature indication information $a_{(i,j)\text{-}1}$, $a_{(i,j)\text{-}2}$, $\ldots$, $a_{(i,j)\text{-}16}$, and $x_{(i,j)\text{-}16}$ being 1 indicates "yes", and the feature indication information $a_{(i,j)\text{-}1}$, $a_{(i,j)\text{-}2}$, $\ldots$, $a_{(i,j)\text{-}15}$, and $x_{(i,j)\text{-}16}$ being 0 indicates "no". For example, when the data sample $X_{(i,j)}$ represents that a male young man with black hair views a social-type application program whose icon color is blue in the morning, the data sample $X_{(i,j)}$ may be represented by using (1, 0, 0, 1, 0, 0, 1, 0, 1, 0, 1, 0, 0, 1, 0, 0). When the data sample $X_{(i,j)}$ represents that a male juvenile with yellow hair views a game-type application program whose icon color is red in the evening, the data sample $X_{(i,j)}$ may be represented by using (0, 1, 0, 1, 0, 1, 0, 0, 0, 1, 0, 1, 0, 0, 0, 1).

The plurality of features in the data sample are respectively the same as a plurality of features in another data sample. Another data sample may be any one of the at least two data samples except the data sample. A difference is that feature indication information of a same feature in different data samples may be different.

For example, a data sample $X_{(1,1)}$ and a data sample $X_{(2,3)}$ in the at least two data samples are used as an example. Both the data sample $X_{(1,1)}$ and the data sample $X_{(2,3)}$ may include the following features: "whether the user is male", "whether the user has black hair", "whether the icon of the application program is red", "whether the time when the user operates the application program is in the morning", and so on.

However, the feature "whether the user is male" is used as an example, feature indication information (for example, a user 1 is male) of the feature "whether the user is male" in the data sample $X_{(1,1)}$ may be different from feature indication information (for example, a user 2 is not male) of the feature "whether the user is male" in the data sample $X_{(2,3)}$.

A "positive operation probability of a data sample" may be used to represent a possibility that a user corresponding to the data sample performs a positive operation on an application program corresponding to the data sample. For example, the positive operation probability $P_{(i,j)}$ of the data sample $X_{(i,j)}$ is used to represent a possibility that the user i performs a positive operation on the application program j.

"Positive operation feedback information of a data sample" may be used to indicate whether a user corresponding to the data sample has performed, in a preset time period, a positive operation on an application program corresponding to the data sample. For example, positive operation feedback information $y_{(i,j)}$ of the data sample $X_{(i,j)}$ is used to indicate whether the user i has performed a positive operation on the application program j in the preset time period. When $y_{(i,j)}$ is 1, it may indicate that the user i has performed a positive operation on the application program j in the preset time period. When $y_{(i,j)}$ is 0, it may indicate that the user i has not performed a positive operation on the application program j in the preset time period.

A method for determining, by a terminal device, whether the user has performed a positive operation on the application program in the preset time period may include the following: If the user has performed a positive operation on the application program once in the preset time period, the terminal device may assign 1 to the positive operation feedback information, indicating that "the user has performed a positive operation on the application program"; or if the user has not performed a positive operation on the application program in the preset time period, the terminal device may assign 0 to the positive operation feedback information, indicating that "the user has not performed a positive operation on the application program".

Alternatively, a method for determining, by a terminal device, whether the user has performed a positive operation on the application program in the preset time period may include the following: If a quantity of forward operations performed by the user on the application program in the preset time period reaches a value, the terminal device may assign 1 to the positive operation feedback information, indicating that "the user has performed a positive operation on the application program"; or if a quantity of forward operations performed by the user on the application program in the preset time period does not reach a value, the terminal device may assign 0 to the positive operation feedback information, indicating that "the user has not performed a positive operation on the application program".

That an application recommendation interface displays an application program in the embodiments of the present invention may be specifically as follows: The application recommendation interface displays a name and an icon of the application program and an interface generated during running of the application program.

FIG. 1 is a schematic diagram of a network architecture of an application program recommendation system according to an embodiment. As shown in FIG. 1, an application program recommendation system 10 includes an application recommendation server 11, at least two application program servers 12, and at least two terminal devices 13.

In this embodiment, an application program sorting method is described herein by using an example in which the terminal devices 13, the application program servers 12, and the application recommendation server 11 interact with each other to recommend an application program. Specifically, the application recommendation server 11 obtains a historical operation record of a user that is on each of the at least two terminal devices and that corresponds to an application program. The application recommendation server 11 recommends a sorted application program to each of the at least two terminal devices 13, and displays the application program in each of application recommendation interfaces on the at least two terminal devices 13. When a positive operation is performed on the application program displayed in the application recommendation interface of the terminal device 13, the corresponding application program server 12 provides an application service for the application program.

For example, the terminal device 13 may be a terminal device such as a Personal Computer (PC), a mobile phone, a tablet computer, and a portable computer.

The application program sorting method provided in the disclosed embodiments may be executed by an application program sorting apparatus. The application program sorting apparatus may be an application recommendation server (such as the application recommendation server 11 shown in FIG. 1). In addition, the application program sorting apparatus may be a terminal device (such as the at least two terminal devices 13 shown in FIG. 1) on which software that can provide a service such as application program download is installed, or a Central Processing Unit (CPU) of the terminal device, or a control module that is in the terminal device and that is configured to sort application programs. In this embodiment of the present invention, the application program sorting method provided in the embodiments of the present invention is described by using an example in which the application recommendation server performs the application program sorting method.

It should be noted that the application recommendation interface of the terminal device may include a plurality of areas, and different areas have different functions. For example, the application recommendation interface may include an application program display area, and the application recommendation interface displays a plurality of sorted application programs to the user in the application program display area. The application program display area may include a plurality of display positions, and each display position may display one application program. Usually, different application programs are displayed at different display positions. Each of the plurality of application programs may have an identifier used to distinguish the application program from another application program, and different application programs correspond to different identifiers. For example, the identifier of the application program may be a name (such as an ID 1) or an icon of the application program.

Figure 2:
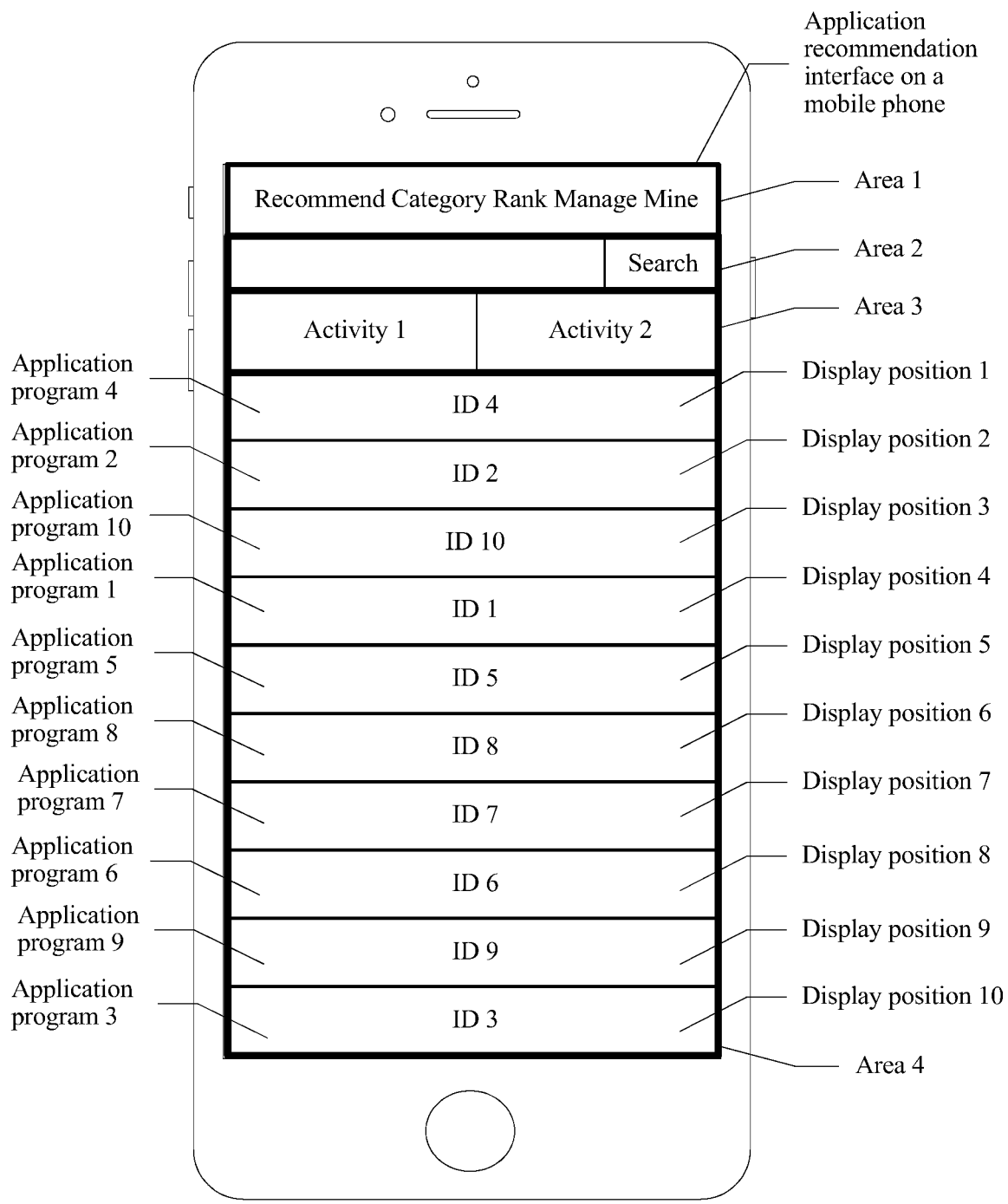
FIG. 2 is a schematic diagram of an application recommendation interface of a terminal device according to an embodiment of the present invention.

For example, FIG. 2 is a schematic diagram of an application recommendation interface of a terminal device according to an embodiment of the present invention. In this embodiment of the present invention, descriptions are provided herein by using only an example of an application recommendation interface provided by a mobile phone that is an example of the terminal device, and by displaying at least one sorted application program in the application recommendation interface.

As shown in FIG. 2, the application recommendation interface includes an area 1, an area 2, an area 3, and an area 4. The area 1 is a menu area, and may provide a plurality of function selections for a user. For example, if the terminal device detects that "manage" in the area 1 is triggered, the terminal device may display, to the user, information such as an application program that has been downloaded by the user and an application program that is being downloaded by the user. The area 2 is a search area, and may provide an input box for the user to search for an application program. If the terminal device detects an identifier that is of an application program (for example, the identifier of the application program is an ID 1) and that is entered into the input box in the area 2, the terminal device may display the application program whose identifier is the ID 1 to the user. The area 3 is an activity area, and may display publicity information and the like of some application programs to the user. The area 4 is an application program display area, and may display a plurality of sorted application programs to the user by using a plurality of display positions in the application recommendation interface.

For example, the terminal device may display, to the user by using the application recommendation interface of the terminal device, 10 application programs shown in FIG. 2. Specifically, in the application recommendation interface in FIG. 2, an application program 4 whose identifier is an ID 4 is displayed at a display position 1, an application program 2 whose identifier is an ID 2 is displayed at a display position 2, an application program 10 whose identifier is an ID 10 is displayed at a display position 3, an application program 1 whose identifier is an ID 1 is displayed at a display position 4, an application program 5 whose identifier is an ID 5 is displayed at a display position 5, an application program 8 whose identifier is an ID 8 is displayed at a display position 6, an application program 7 whose identifier is an ID 7 is displayed at a display position 7, an application program 6 whose identifier is an ID 6 is displayed at a display position 8, an application program 9 whose identifier is an ID 9 is displayed at a display position 9, and an application program 3 whose identifier is an ID 3 is displayed at a display position 10.

In the application program sorting method provided in the disclosed embodiments, a positive operation probability of each data sample may be corrected, so that a corrected positive operation probability can better reflect a possibility that a user performs a positive operation on an application program. In addition, the application programs are sorted based on corrected positive operation probabilities, so that an application program sorting result meeting a user preference may be obtained, that is, a possibility that the user performs a positive operation on an application program displayed in an application recommendation interface of a terminal device of the user is larger.

An application program sorting method and apparatus provided in the disclosed embodiments are described below in detail with reference to the accompanying drawings by using specific embodiments and application scenarios of the embodiments.

Figure 3:
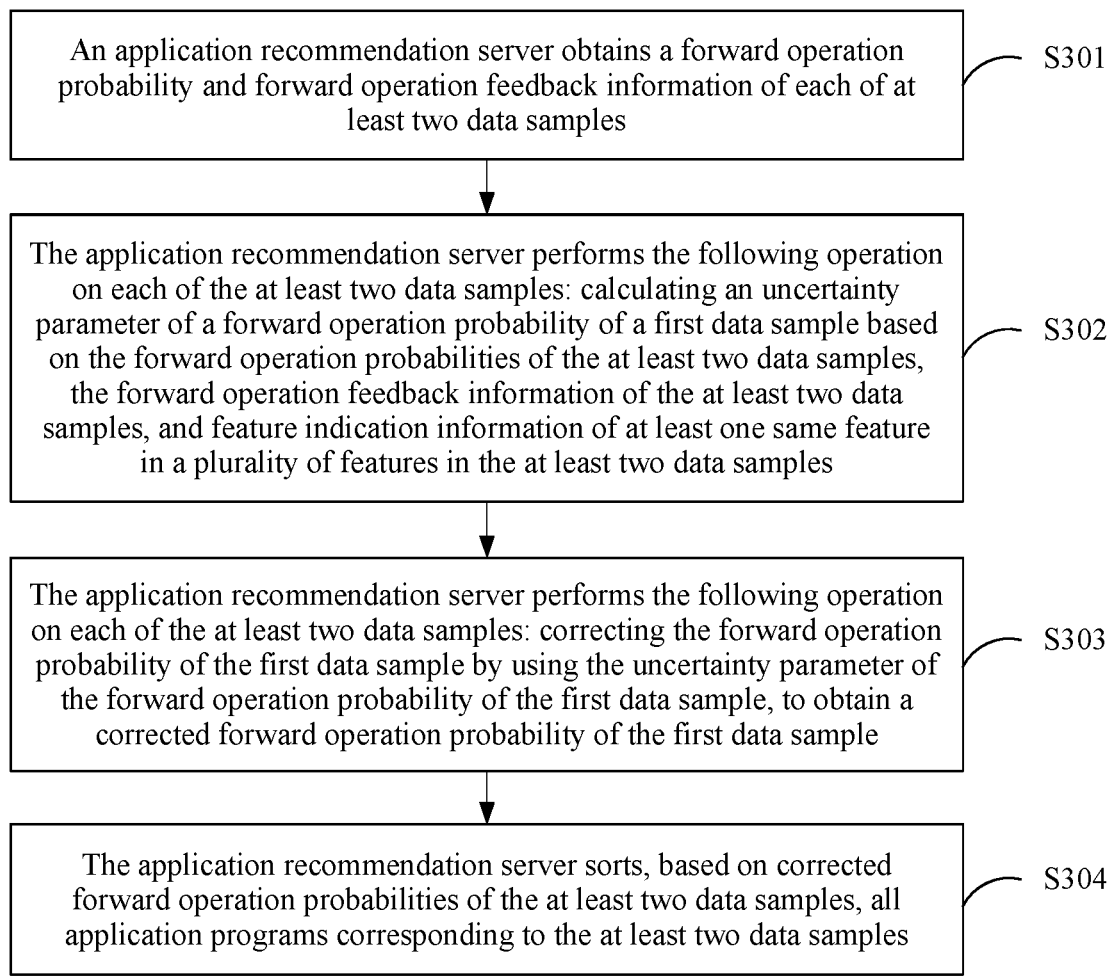
FIG. 3 is a flowchart 1 of an application program sorting method according to an embodiment of the present invention.

An embodiment of an application program sorting method is disclosed, as shown in FIG. 3, in which the application program sorting method includes S301 to S304.

S301: An application recommendation server obtains a positive operation probability and positive operation feedback information of each of at least two data samples.

Figure 4:
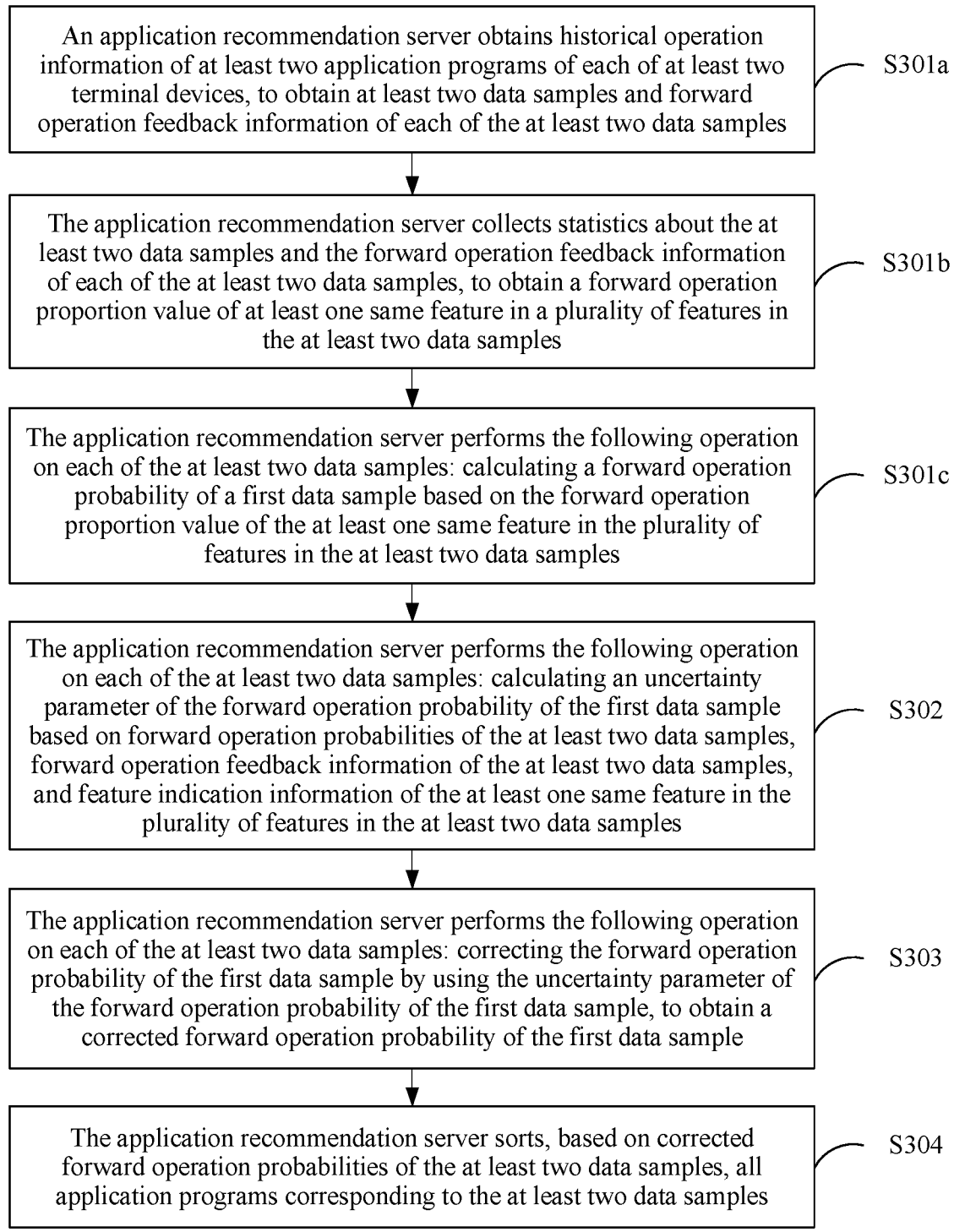
FIG. 4 is a flowchart 2 of an application program sorting method according to an embodiment of the present invention.

For example, as shown in FIG. 4, a method in which the application recommendation server obtains the positive operation probability and the positive operation feedback information of each of the at least two data samples may include S301a to S301c, in other words, S301 in FIG. 3 may include S301a to S301c.

S301a: The application recommendation server obtains historical operation information of at least two application programs of each of at least two terminal devices, to obtain the at least two data samples and the positive operation feedback information of each of the at least two data samples.

Each terminal device may store a historical operation record of an operation performed by a corresponding user on an application program in an application recommendation interface of the terminal device. The application recommendation server may analyze the historical operation record of each of the at least two terminal devices, to obtain the historical operation information of the at least two application programs of each of the at least two terminal devices, so as to obtain the at least two data samples and the positive operation feedback information of each of the at least two data samples. The historical operation records of the at least two terminal devices may include a plurality of data samples. Usually, terminal devices are in a one-to-one correspondence with users, and different terminal devices correspond to different users.

It should be noted that the at least two data samples mentioned in this embodiment of the present invention may be all data samples in the historical operation records of the at least two terminal devices; or the at least two data samples may be some data samples in the historical operation records of the at least two terminal devices. This is not limited in this embodiment of the present invention.

For example, the at least two terminal devices include a terminal device 1 and a terminal device 2. The terminal device 1 may correspond to a user 1. The user 1 and an application program 1 whose identifier is an ID 1, the user 1 and an application program 2 whose identifier is an ID 2, and the user 1 and an application program 3 whose identifier is an ID 3 may respectively form three data samples: a data sample $X_{(1,1)}$, a data sample $X_{(1,2)}$, and a data sample $X_{(1,3)}$ The terminal device 2 may correspond to a user 2. The user 2 and the application program 1 whose identifier is the ID 1, the user 2 and the application program 2 whose identifier is the ID 2, and the user 2 and the application program 3 whose identifier is the ID 3 may respectively form three data samples: a data sample $X_{(2,1)}$, a data sample $X_{(2,2)}$, and a data sample $X_{(2,3)}$. Positive operation feedback information of the data sample $X_{(1,1)}$ is $y_{(1,1)}$, positive operation feedback information of the data sample $X_{(1,2)}$ is $y_{(1,2)}$, and positive operation feedback information of the data sample $X_{(1,3)}$ is $y_{(1,3)}$. Positive operation feedback information of the data sample $X_{(2,1)}$ is $y_{(2,1)}$, positive operation feedback information of the data sample $X_{(2,2)}$ is $y_{(2,2)}$, and positive operation feedback information of the data sample $X_{(2,3)}$ is $y_{(2,3)}$.

Based on the foregoing embodiment, the at least two data samples in this embodiment of the present invention may include all data samples (in other words, the data samples $X_{(1,1)}$, $X_{(1,2)}$, $X_{(1,3)}$, $X_{(2,1)}$, $X_{(2,2)}$, and $X_{(2,3)}$) in the foregoing embodiment. Alternatively, the at least two data samples may include only some data samples in the foregoing embodiment. For example, the at least two data samples may include the data samples $X_{(1,1)}$, $X_{(1,2)}$, $X_{(2,2)}$, and $X_{(2,3)}$.

S301b: The application recommendation server collects statistics about the at least two data samples and the positive operation feedback information of each of the at least two data samples, to obtain a positive operation proportion value of at least one same feature in a plurality of features in the at least two data samples.

For example, in a data sample $X_{(i,j)}=\{x_{1(i,j)}, x_{2(i,j)}, x_{3(i,j)}\}$ and that is of a user i and an application program j, a feature $x_{1(i,j)}$ of the user i may include at least one feature (such as a feature $x_{(i,j)-a}$), a feature $x_{2(i,j)}$ of the application program j may include at least one feature (such as a feature $x_{(i,j)-b}$), and a scenario $x_{3(i,j)}$ in which the user i operates the application program j may include at least one feature (such as a feature $x_{(i,j)-c}$). In other words, the data sample $X_{(i,j)}$ may include at least three features (such as $x_{(i,j)-a}$, $x_{(i,j)-b}$, and $x_{(i,j)-c}$). Each of the at least three features may affect "whether the user i performs a positive operation on the application program j".

It is assumed that the data sample $X_{(i,j)}$ may include the three features $x_{(i,j)-a}$, $x_{(i,j)-b}$, and $x_{(i,j)-c}$. In this case, when i is any value in $\{1, 2, \ldots, m\}$ and j is any value in $\{1, 2, \ldots, n\}$, the obtained $x_{(i,j)-a}$ is a same feature, the obtained $x_{(i,j)-b}$ is a same feature, and the obtained $x_{(i,j)-c}$ is a same feature.

For example, $x_{(i,j)-a}$ (i is sequentially set to each value in $\{1, 2, \ldots, m\}$, and i is sequentially set to each value in $\{1, 2, \ldots, n\}$) may be a same feature; $x_{(i,j)-b}$ (i is sequentially set to each value in $\{1, 2, \ldots, m\}$, and j is sequentially set to each value in $\{1, 2, \ldots, n\}$) may be a same feature; $x_{(i,j)-c}$ (i is sequentially set to each value in $\{1, 2, \ldots, m\}$, and i is sequentially set to each value in $\{1, 2, \ldots, n\}$) may be a same feature.

The at least one same feature may include some or all of the plurality of features.

In this embodiment of the present invention, when feature indication information of any one of the plurality of features is 0, it indicates that the feature has no impact on "whether the user performs a positive operation on the application program". Alternatively, when feature indication information of any one of the plurality of features is 1, it indicates that the feature may affect "whether the user performs a positive operation on the application program". In addition, when positive operation feedback information of the data sample $X_{(i,j)}$ is 1 (that is, the data sample $X_{(i,j)}$ is a forward data sample), it indicates that a feature whose feature indication information is 1 and that is in the data sample $X_{(i,j)}$ has affected "whether the user i performs a positive operation on the application program j".

In this way, the application recommendation server may collect statistics about a quantity η of forward data samples in the at least two data samples, and for a $k^{th}$ same feature $x_{(i,j)-k}$ (i is sequentially set to a value in $\{1, 2, \ldots, m\}$, j is sequentially set to a value in $\{1, 2, \ldots, n\}$, and the $k^{th}$ same feature $x_{(i,j)-k}$ may be any one of $x_{(i,j)-a}$, $x_{(i,j)-b}$, or $x_{(i,j)-c}$) in each of the forward data samples, collect statistics about a quantity $\beta_k$ of forward data samples, in the forward data samples, in which feature indication information $a_{(i,j)-k}$ of the $k^{th}$ same feature $x_{(i,j)-k}$ is 1; and calculate a ratio of the quantity $\beta_k$ that is obtained through statistics collection and that is of forward data samples in which the feature indication information $a_{(i,j)-k}$ of the $k^{th}$ same feature $x_{(i,j)-k}$ is 1 to the quantity η of forward data samples, to obtain a positive operation proportion value $W_k$ that is of the $k^{th}$ same feature $x_{(i,j)-k}$ and that affects the positive operation feedback information $y_{(i,j)}$ of the data sample $X_{(i,j)}$ being 1. In other words, $w_k=\beta_k/\eta$, where $k \in \{1, 2, \ldots, q\}$.

The positive operation proportion value $x_{(i,j)-k}$ of the feature $w_k$ may represent a degree of an impact of the $k^{th}$ same feature $x_{(i,j)-k}$ on "whether the user i performs a positive operation on the application program j". A larger positive operation proportion value $w_k$ of the $k^{th}$ feature $x_{(i,j)-k}$ indicates a greater impact of the $k^{th}$ feature $x_{(i,j)-k}$ on "whether the user performs a positive operation on the application program".

For example, when the at least one same feature is all same features in the plurality of features, the application recommendation server may calculate a positive operation proportion value (such as $w_a$, $w_b$, and $w_c$) of any one of the plurality of features (such as $x_{(i,j)-a}$, $x_{(i,j)-b}$, and $x_{(i,j)-c}$) included in the at least two data samples, to obtain a positive operation proportion value set $W=(w_a, w_b, w_c)$. In this case, a quantity of dimensions of the positive operation proportion value set W is the same as a quantity of dimensions of the data sample $X_{(i,j)}$. That is, the quantity of dimensions of the positive operation proportion value set W is the same as a quantity of features included in the data sample $X_{(i,j)}$.

It is assumed that a feature $X_{(i,j)-1}$ represents "whether the user i is male", a feature $x_{(i,j)-2}$ represents "whether an icon of the application program j is blue", and a feature $x_{(i,j)-3}$ represents "whether a time at which the user i operates the application program j is in the morning".

In addition, $X_{(1,1)}=(1,0,1)$, and the positive operation feedback information $y_{(1,1)}$ of $X_{(1,1)}$ is 0; $X_{(1,2)}=(1,0,1)$, and the positive operation feedback information $y_{(1,2)}$ of $X_{(1,2)}$ is 1; $X_{(1,3)}=(0,1,0)$ and the positive operation feedback information $y_{(1,3)}$ of $X_{(1,3)}$ is 1; $X_{(2,1)}=(0,1,0)$, and the positive operation feedback information $y_{(2,1)}$ of $X_{(2,1)}$ is 1; $X_{(2,2)}=(1,1,1)$, and the positive operation feedback information $y_{(2,2)}$ of $X_{(2,2)}$ is 0; and $X_{(2,3)}=(1,1,0)$, and the positive operation feedback information $y_{(2,3)}$ of $X_{(2,3)}$ is 1.

Table 1 shows a data sample list corresponding to the at least two data samples provided herein in this embodiment of the present invention.

TABLE 1

Data sample list

| | Application program j | | |
|---|---|---|---|
| User i | Application program 1 (j = 1) | Application program 2 (j = 2) | Application program 3 (j = 3) |
| User 1 (i = 1) | Data sample $X_{(1,1)}$ = (1, 0, 1) | Data sample $X_{(1,2)}$ = (1, 0, 1) | Data sample $X_{(1,3)}$ = (0, 1, 0) |
| User 2 (i = 2) | Data sample $X_{(2,1)}$ = (0, 1, 0) | Data sample $X_{(2,2)}$ = (1, 1, 1) | Data sample $X_{(2,3)}$ = (1, 1, 0) |

Table 2 shows a data sample information list corresponding to the at least two data samples provided herein in this embodiment of the present invention. The data sample information list may include the feature indication information of all the features in the at least two data samples and the positive operation feedback information of the at least two data samples.

TABLE 2

Data sample information list

| Data sample $X_{(i,j)}$ | Feature indication information $a_{(i,j)-1}$ of an first same feature $x_{(i,j)-1}$ | Feature indication information $a_{(i,j)-2}$ of a second same feature $x_{(i,j)-2}$ | Feature indication information $a_{(i,j)-3}$ of a third same feature $x_{(i,j)-3}$ | Positive operation feedback information $y_{(i,j)}$ |
|---|---|---|---|---|
| $X_{(1,1)}$ = (1, 0, 1) | $a_{(1,1)-1}$ = 1 | $a_{(1,1)-2}$ = 0 | $a_{(1,1)-3}$ = 1 | $y_{(1,1)}$ = 0 |
| $X_{(1,2)}$ = (1, 0, 1) | $a_{(1,2)-1}$ = 1 | $a_{(1,2)-2}$ = 0 | $a_{(1,2)-3}$ = 1 | $y_{(1,2)}$ = 1 |
| $X_{(1,3)}$ = (0, 1, 0) | $a_{(1,3)-1}$ = 0 | $a_{(1,3)-2}$ = 1 | $a_{(1,3)-3}$ = 0 | $y_{(1,3)}$ = 1 |
| $X_{(2,1)}$ = (0, 1, 0) | $a_{(2,1)-1}$ = 0 | $a_{(2,1)-2}$ = 1 | $a_{(2,1)-3}$ = 0 | $y_{(2,1)}$ = 1 |
| $X_{(2,2)}$ = (1, 1, 1) | $a_{(2,2)-1}$ = 1 | $a_{(2,2)-2}$ = 1 | $a_{(2,2)-3}$ = 1 | $y_{(2,2)}$ = 0 |
| $X_{(2,3)}$ = (1, 1, 0) | $a_{(2,3)-1}$ = 1 | $a_{(2,3)-2}$ = 1 | $a_{(2,3)-3}$ = 0 | $y_{(2,3)}$ = 1 |

The application recommendation server may collect statistics about a quantity of data samples (in other words, $X_{(1,2)}$, $X_{(1,3)}$, $X_{(2,1)}$, and $X_{(2,3)}$) whose positive operation feedback information is 1 and that are in the six data samples in Table 2, in other words, η=4; collect statistics about a quantity (in other words, $\beta_1$=2) of data samples in which the feature indication information $a_{(i,j)-1}$ of the initial same feature $x_{(i,j)-1}$ is 1 and that are in the four data samples whose positive operation feedback information is 1; collect statistics about a quantity (in other words, $\beta_2$=3) of data samples in which the feature indication information $a_{(i,j)-2}$ of the second same feature $x_{(i,j)-2}$ is 1 and that are in the four data samples whose positive operation feedback information is 1; collect statistics about a quantity (in other words, $\beta_3$=1) of data samples in which the feature indication information $a_{(i,j)-3}$ of the third same feature $x_{(i,j)-3}$ is 1 and that are in the four data samples whose positive operation feedback information is 1; and calculate a positive operation proportion value $w_1=\beta_1/\eta=2/4=0.5$ of the initial same feature $x_{(i,j)-1}$, a positive operation proportion value $w_2=\beta_2/\eta=3/4=0.75$ of the second same feature $x_{(i,j)-2}$, and a positive operation proportion value $w_3=\beta_3/\eta=1/4=0.25$ of the third same feature $x_{(i,j)-3}$, to obtain a positive operation proportion value set $W=(w_1, w_2, w_3)=(0.5, 0.75, 0.25)$.

S301c: The application recommendation server performs the following operation on each of the at least two data samples: calculating a positive operation probability of a first data sample based on the positive operation proportion value of the at least one same feature in the plurality of features in the at least two data samples.

The first data sample is any one of the at least two data samples. The first data sample is the data sample $X_{(i,j)}$ of the user i and the application program j, $i \in \{1, 2, \ldots, m\}$, m is used to represent a quantity of users, m≥2, $j \in \{1, 2, \ldots, n\}$, n is used to represent a quantity of application programs, and n 2.

The application recommendation server may calculate a positive operation probability $P_{(i,j)}$ of the data sample $X_{(i,j)}$ by using $$P_{(i,j)} = \sum_{k=1}^{q}(w_k \times a_{(i,j)-k}) = w_a \times a_{(i,j)-a} + w_b \times a_{(i,j)-b} + w_c \times a_{(i,j)-c}.$$

When the positive operation proportion value set W may be a matrix of one row and a plurality of columns, and the data sample $X_{(i,j)}$ is a matrix of one column and a plurality of rows, the application recommendation server may further calculate the positive operation probability $P_{(i,j)}$ of the data sample $X_{(i,j)}$ by using $P_{(i,j)}=W \cdot X_{(i,j)}$ because the quantity of dimensions of the positive operation proportion value set W is the same as the quantity of dimensions of the data sample $X_{(i,j)}$, that is, the quantity of dimensions of W is the same as the quantity of features included in the data sample $X_{(i,j)}$.

For example, when a set of proportion values of forward operations performed by the user on the application program is a matrix W=($w_1$ $w_2$ $w_3$)=(0.5 0.75 0.25), and the data sample $$X_{(1,1)} = \begin{pmatrix} a_{(1,1)-1} \\ a_{(1,1)-2} \\ a_{(1,1)-3} \end{pmatrix} = \begin{pmatrix} 1 \\ 0 \\ 1 \end{pmatrix},$$

a positive operation probability of the data sample $X_{(1,1)}$ is $P_{(1,1)}=w_1 \times a_{(1,1)-1}+w_2 \times a_{(1,1)-2}+w_3 \times a_{(i,j)-3}=0.5 \times 1+0.75 \times 0+0.25 \times 1=0.75$.

Optionally, in the method in this embodiment of the present invention, the positive operation probability of the data sample may be further normalized, so that the positive operation probability of the data sample falls within a value range of 0 to 1. In this way, a normalized positive operation probability, of the data sample, falling within the value range of 0 to 1 helps simplify calculation related to the positive operation probability of the data sample in this embodiment of the present invention.

S302: The application recommendation server performs the following operation on each of the at least two data samples: calculating an uncertainty parameter of a positive operation probability of a first data sample based on the positive operation probabilities of the at least two data samples, the positive operation feedback information of the at least two data samples, and feature indication information of at least one same feature in the plurality of features in the at least two data samples.

The first data sample is any one of the at least two data samples.

Figure 5:
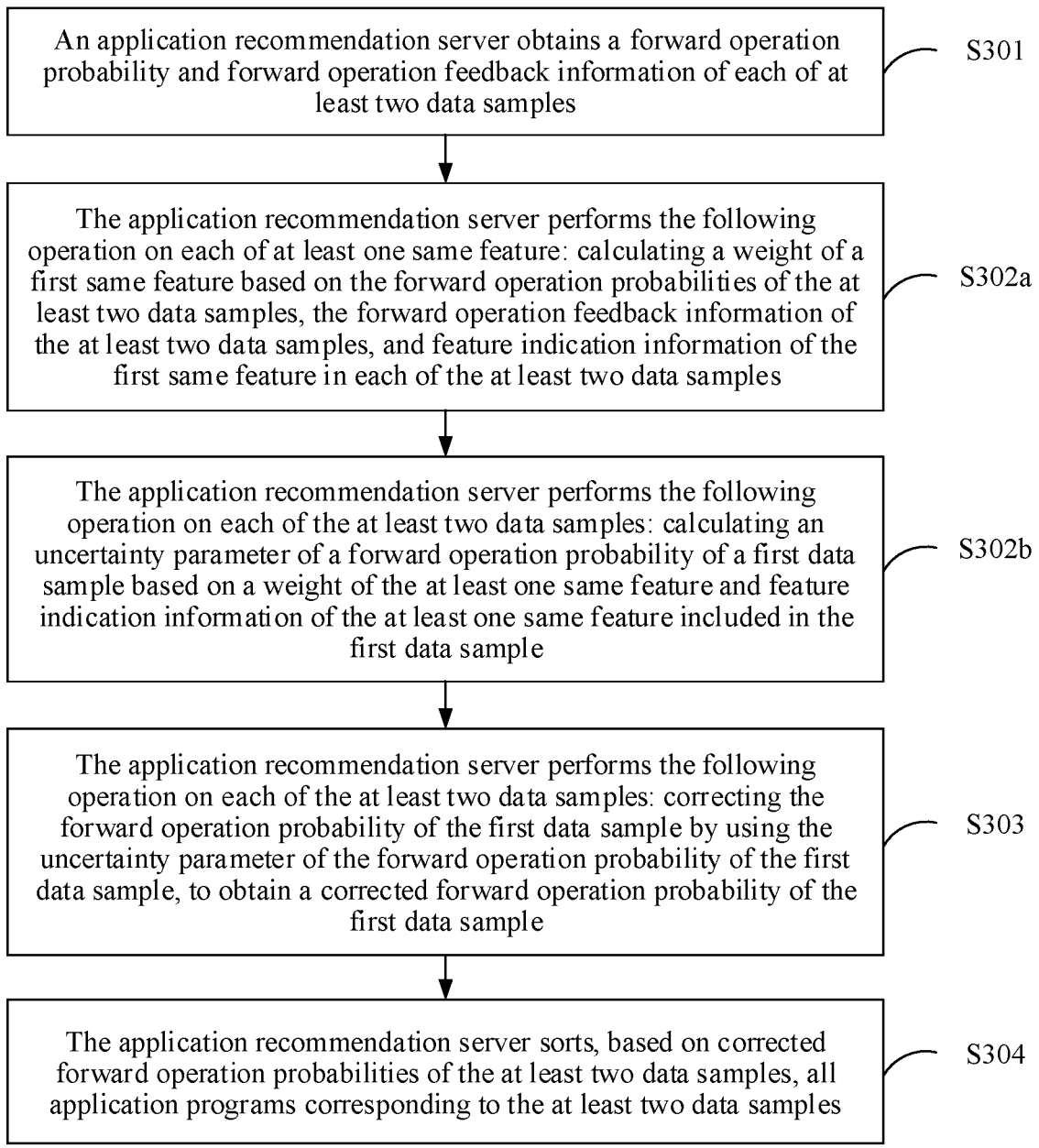
FIG. 5 is a flowchart 3 of an application program sorting method according to an embodiment of the present invention.

For example, as shown in FIG. 5, S302 in FIG. 3 may include S302a and S302b:

S302a: The application recommendation server performs the following operation on each of the at least one same feature: calculating a weight of a first same feature based on the positive operation probabilities of the at least two data samples, the positive operation feedback information of the at least two data samples, and feature indication information of the first same feature in each of the at least two data samples.

The first same feature is any one of the at least one same feature.

For example, the at least one same feature herein in this embodiment of the present invention may be all same features in the plurality of features. When the user has performed a positive operation on the application program, a larger quantity of times that any feature appears in a plurality of data samples indicates a greater impact of the feature on "whether the user performs a positive operation on the application program". In addition, a smaller difference between the positive operation probability and the positive operation feedback information of any data sample indicates higher accuracy of the positive operation probability of the data sample. Therefore, the application recommendation server may calculate a weight $n_k$ of a $k^{th}$ same feature in the at least two data samples by using $$n_k = \sum_{j=1}^{n} \sum_{i=1}^{m} ((P_{(i,j)} - y_{(i,j)}) \times a_{(i,j)-k})^2.$$

$X_{(i,j)}$ is used to represent a data sample corresponding to a user i and an application program j, i∈{1, 2, ..., m}, m is used to represent a quantity of users, m≥2, j∈{1, 2, ..., n}, n is used to represent a quantity of application programs, and n≥2; $P_{(i,j)}$; is used to represent a positive operation probability of $X_{(i,j)}$ and $y_{(i,j)}$ is used to represent positive operation feedback information of $X_{(i,j)}$; and $a_{(i,j)-k}$ is used to represent feature indication information of the $k^{th}$ same feature $x_{(i,j)-k}$ in $X_{(i,j)}$, k∈{1, 2, ..., q}, q is used to represent a quantity of features in $X_{(i,j)}$, and q≤3.

Specifically, when the feature indication information $a_{(i,j)-k}$ of the $k^{th}$ same feature $x_{(i,j)-k}$ in the data sample $X_{(i,j)}$ is 1, it indicates that the $k^{th}$ same feature $x_{(i,j)-k}$ affects the positive operation probability $P_{(i,j)}$ of the data sample $X_{(i,j)}$. A difference $P_{(i,j)}-y_{(i,j)}$ between the positive operation probability $P_{(i,j)}$ and the positive operation feedback information $y_{(i,j)}$ of the data sample $X_{(i,j)}$ may reflect accuracy of the positive operation probability $P_{(i,j)}$. For example, a smaller $P_{(i,j)}-y_{(i,j)}$ indicates higher accuracy of the positive operation probability $P_{(i,j)}$. In this case, the weight of $n_k$ of the $k^{th}$ same feature $x_{(i,j)-k}$ may be obtained by using the feature indication information $a_{(i,j)-k}$ of the $k^{th}$ same feature $x_{(i,j)-k}$ in the data sample $X_{(i,j)}$ and the difference $P_{(i,j)}-y_{(i,j)}$ between the positive operation probability $P_{(i,j)}$ and the positive operation feedback information $y_{(i,j)}$ of the data sample $X_{(i,j)}$.

S302b: The application recommendation server performs the following operation on each of the at least two data samples: calculating the uncertainty parameter of the positive operation probability of the first data sample based on a weight of the at least one same feature and feature indication information of the at least one same feature included in the first data sample.

When the user has performed a positive operation on the application program (for example, the positive operation feedback information $y_{(i,j)}$ of the data sample $X_{(i,j)}$ is 1), a higher weight of any feature (such as the $k^{th}$ same feature $X_{(i,j)-k}$) in the plurality of data samples indicates a smaller impact of the feature (the $k^{th}$ same feature $x_{(i,j)-k}$) on an uncertainty of a probability that "the user performs a positive operation on the application program". Therefore, the application recommendation server may calculate the uncertainty parameter $uc_{(i,j)}$ of the positive operation probability $P_{(i,j)}$ of the data sample $X_{(i,j)}$ by using $$uc_{(i,j)} = \sum_{k=1}^{q} \frac{a_{(i,j)-k}}{\sqrt{n_k}}.$$

$n_k$ is used to represent the weight of the $k^{th}$ same feature $x_{(i,j)-k}$ in $X_{(i,j)}$.

The application recommendation server may further normalize the uncertainty parameter $uc_{(i,j)}$ of the positive operation probability $P_{(i,j)}$ to a value from 0 to 1. A normalization method may be as follows: When the uncertainty parameter $uc_{(i,j)}$, is greater than 1, the uncertainty parameter $uc_{(i,j)}$ is directly set to 1; or when the uncertainty parameter $uc_{(i,j)}$ is not greater than 1, $uc_{(i,j)}$ is divided by a maximum value in $\{uc_{(i,j)}\}$ by using $$uc_{(i,j)} = \frac{uc_{(i,j)}}{\max_i \{uc_{(i,j)}\}}.$$

In this way, a normalized uncertainty parameter $uc_{(i,j)}$ that is of the positive operation probability $P_{(i,j)}$ and that falls within the value range of 0 to 1 helps simplify calculation related to the uncertainty parameter $uc_{(i,j)}$ of the positive operation probability $P_{(i,j)}$ in this embodiment of the present invention.

S303: The application recommendation server performs the following operation on each of the at least two data samples: correcting the positive operation probability of the first data sample by using the uncertainty parameter of the positive operation probability of the first data sample, to obtain a corrected positive operation probability of the first data sample.

Specifically, the application recommendation server may correct the positive operation probability $P_{(i,j)}$ of the data sample $X_{(i,j)}$ by using $P_{(i,j)}^1 = P_{(i,j)} \times uc_{(i,j)}$, to obtain a corrected positive operation probability $P_{(i,j)}^1$ of $X_{(i,j)}$. The corrected positive operation probability $P_{(i,j)}^1$ can better reflect a possibility that the user performs a positive operation on the application program. The first data sample is the data sample $X_{(i,j)}$ of the user i and the application program j, i∈{1, 2, . . . , m}, m is used to represent the quantity of users, m≥2, j∈{1, 2, . . . , n}, n is used to represent the quantity of application programs, and n≥2; and $uc_{(i,j)}$ is used to represent the uncertainty parameter of the positive operation probability $P_{(i,j)}$ of $X_{(i,j)}$.

S304: The application recommendation server sorts, based on corrected positive operation probabilities of the at least two data samples, all application programs corresponding to the at least two data samples.

Specifically, the application recommendation server may sort, in descending order of the corrected positive operation probabilities of all the data samples, the application programs corresponding to the at least two data samples, and then display the sorted application programs to the user by using the application recommendation interface.

A larger corrected positive operation probability of the data sample indicates a larger possibility that the user corresponding to the data sample performs a positive operation on the application program corresponding to the data sample. Therefore, when the application programs are sorted in descending order of the corrected positive operation probabilities of the data samples, an application program on which the user is more likely to perform a positive operation may rank higher.

In the application program sorting method provided in this embodiment of the present invention, the uncertainty parameter of the positive operation probability of each data sample may be calculated based on the positive operation probabilities of the at least two data samples, the positive operation feedback information of the at least two data samples, and the feature indication information of the at least one same feature in the plurality of features in the at least two data samples, and the positive operation probability of the data sample is then corrected by using the uncertainty parameter of each positive operation probability, to obtain the corrected positive operation probability of the data sample. Compared with the uncorrected positive operation probability, the corrected positive operation probability can more accurately reflect the possibility that the user performs a positive operation on the application program. Therefore, compared with an application program sorting result obtained after the application programs are sorted by using the uncorrected positive operation probabilities, an application program sorting result obtained after all the application programs corresponding to the at least two data samples are sorted based on the corrected positive operation probabilities of the at least two data samples can increase the possibility that the user performs a positive operation on the application program.

Further, in addition to the uncertainty of the positive operation probability, a user attention degree of a display position also affects the positive operation probability of the data sample. For example, a possibility that a positive operation is performed on an application program displayed at a higher display position in the application recommendation interface is usually greater than a possibility that a positive operation is performed on an application program displayed at a lower display position. Therefore, in this embodiment of the present invention, the positive operation probability of the data sample may be further corrected by using the user attention degree of the display position. Specifically, before S303, the method in this embodiment of the present invention may further include S305, and S303 may be correspondingly replaced with S303'.

Figure 6:
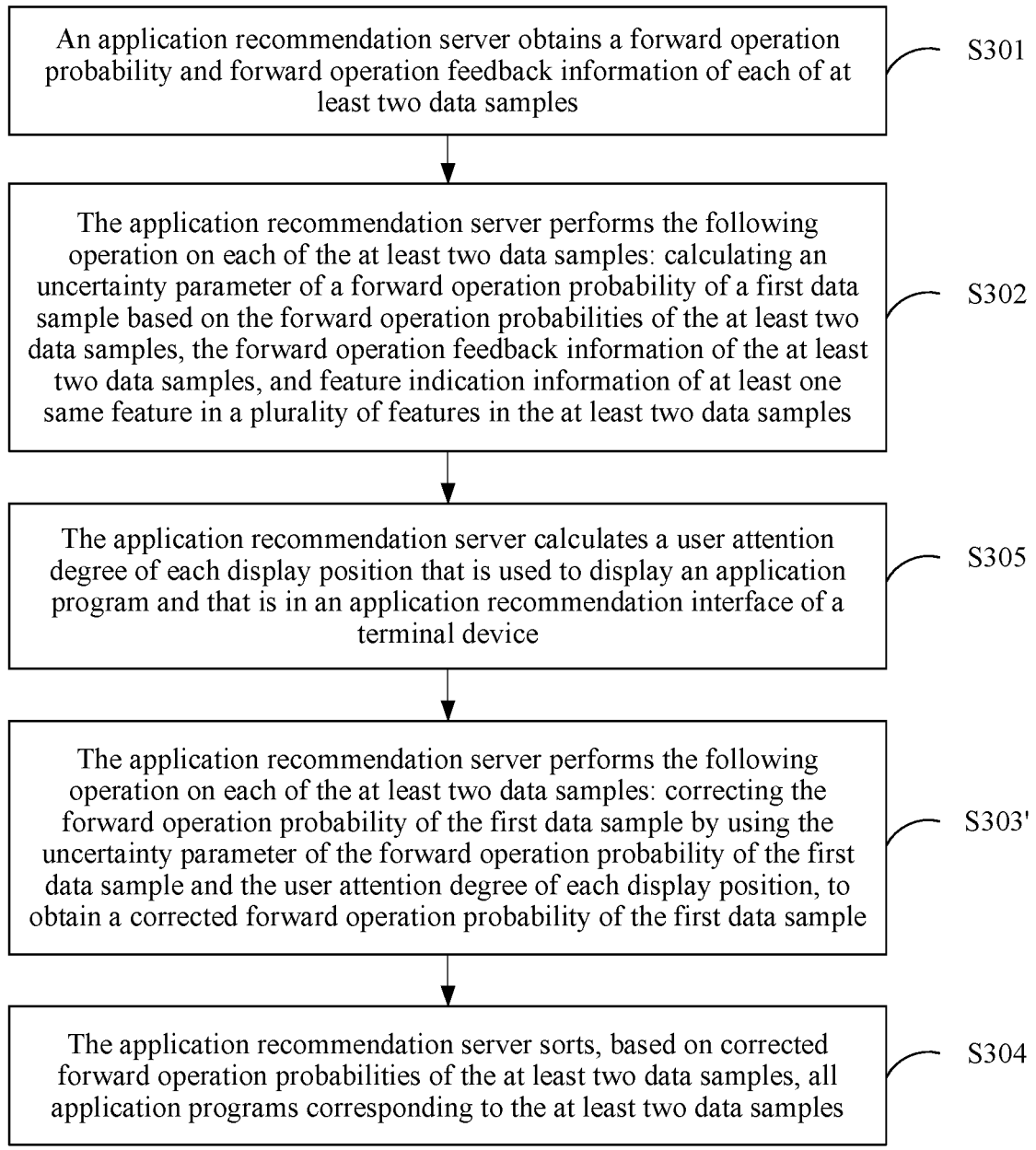
FIG. 6 is a flowchart 4 of an application program sorting method according to an embodiment of the present invention.

For example, as shown in FIG. 6, before S303 shown in FIG. 3, the method in this embodiment of the present invention may further include S305. Correspondingly, as shown in FIG. 6, S303 in FIG. 3 may be replaced with S303'.

S305: The application recommendation server calculates a user attention degree of each display position that is used to display an application program and that is in an application recommendation interface of the terminal device.

For example, the application recommendation server may calculate, in the following manners, the user attention degree of each display position that is used to display an application program and that is in the application recommendation interface of the terminal device.

Manner 1: The application recommendation server obtains a quantity of forward operations performed in a time period on an application program displayed at each display position. The quantity of forward operations performed on the application program displayed at each display position is used to represent the user attention degree of the display position.

Manner 2: The application recommendation server obtains a quantity of forward operations performed in a time period on an application program displayed at each display position, and calculates a ratio of the quantity of forward operations performed on the application program displayed at each display position to a quantity of forward operations performed on an application program displayed at a first display position. A ratio of a quantity of forward operations performed on an application program displayed at any display position to the quantity of forward operations performed on the application program displayed at the first display position is used to represent the user attention degree of the display position. The first display position is a display position in the display positions, where a maximum quantity of forward operations are performed on an application program displayed at the display position.

The time period may be before the application recommendation server calculates the user attention degree of each display position, and duration of the time period may be preset.

It may be figured out that before the application recommendation server calculates the user attention degree of each display position, the application recommendation server may obtain, once in a time period, the quantity of forward operations performed on the application program displayed at each display position; or the application recommendation server may obtain, once at intervals, the quantity of forward operations performed on the application program displayed at each display position in the application recommendation interface of the terminal device.

When the application recommendation server displays the application program in the application recommendation interface of the application recommendation server, the application recommendation server usually may display an application program with a relatively high user score at a relatively high display position, and display an application program with a relatively low user score at a relatively low display position. In other words, in addition to the display position, factors affecting whether the user performs a positive operation on the application program may further include a user score. To eliminate an impact of the user score on that the user performs a positive operation on the application program, the application recommendation server may first randomly display each application program at each display position in the application recommendation interface in a random sorting manner, and then collect statistics about the quantity of forward operations performed by the user on the application program at each display position, to obtain the user attention degree of each display position.

For example, it is assumed that the application recommendation interface includes N display positions. The application recommendation server may evenly divide, into N portions, all users to which an application program may be recommended, and each portion of users may include a plurality of users. When displaying an application program in the application recommendation interface for the first time, the application recommendation server may fixedly display the application program at an initial first display position (such as the display position 1 in FIG. 2) to one of the N portions of users. When displaying the same application program in the application recommendation interface for the second time, the application recommendation server may fixedly display the application program at a second display position (such as the display position 2 in FIG. 2) to another portion of the N portions of users, until the application program is displayed at each of the N display positions after the application program is displayed in the application recommendation interface N times. Different users may correspond to different user identities, and an identity of the user may be a user name registered when the user uses software such as an application market installed on the terminal device. That "all the users to which an application program may be recommended may be evenly divided into N portions" may be that the application recommendation server may evenly divide, into N portions, user identities of all the users to which an application program may be recommended.

The application recommendation server may collect statistics about a quantity of forward operations performed, on an application program displayed at each display position (which is referred to as a quantity of forward operations performed at the display position for short), in a specific time (such as one day, one week, or one month) after the application program is displayed in the application recommendation interface each time. The quantity of forward operations performed on the application program displayed at each display position may be used as the user attention degree of the display position.

Further, the application recommendation server may normalize the quantity of forward operations performed at each display position, and determine, as the user attention degree of the display position, a result obtained after the quantity of forward operations performed at each display position is normalized.

For example, the application recommendation server may normalize, by using $$b\{pos(j, l)\} = \frac{\text{pos\_count}\{pos(j, l)\}}{\max_T \{\text{pos\_count}(pos(j, l))\}},$$

a quantity pos count$\{pos(j,l)\}$ of forward operations performed on an application program at a display position pos(j,l), to obtain a user attention degree b$\{pos(j,l)\}$ of the display position.

b$\{pos(j,l)\}$ is used to represent the user attention degree of the display position pos(j,l) at which the application program j is displayed for the $l^{th}$ time in the application recommendation interface, l∈{1, 2, . . . , T}, T is used to represent a quantity of times of displaying the application program j in the application recommendation interface, and T≥1; pos count({pos(j,l)} is used to represent the quantity of forward operations performed on the application program at the display position pos(j,l); max, {pos count(pos(j,l))} is used to represent a maximum quantity of forward operations performed on the application program j displayed T times at a display position in the application recommendation interface.

In this way, the user attention degree b$\{pos(j,l)\}$ that is of the display position and that is obtained by normalizing the quantity pos count$\{pos(j,l)\}$ of forward operations performed on the application program at the display position pos(j,l) helps simply calculation related to the user attention degree of the display position in this embodiment of the present invention.

For example, it is assumed that the application recommendation interface includes N display positions and M to-be-displayed application programs, and N≤M. The application recommendation server may randomly select one application program from the M to-be-displayed application programs, randomly select one display position from the N display positions, and display the selected application program at the selected display position, until there is an application program displayed at each of the N display positions.

The application recommendation server may collect statistics about a quantity of forward operations performed at each display position in a specific time (such as one day, one week, or one month). The quantity of forward operations performed at each display position may be used as the user attention degree of the display position.

Further, the application recommendation server may normalize the quantity of forward operations performed at each display position, and determine, as the user attention degree of the display position, a result obtained after the quantity of forward operations performed at each display position is normalized. Herein in this embodiment of the present invention, for detailed descriptions of "normalizing the quantity of forward operations performed at each display position", refer to the related descriptions in the foregoing embodiment. Details are not described herein.

S303': The application recommendation server performs the following operation on each of the at least two data samples: correcting the positive operation probability of the first data sample by using the uncertainty parameter of the positive operation probability of the first data sample and the user attention degree of each display position, to obtain a corrected positive operation probability of the first data sample.

Both the uncertainty of the positive operation probability of the data sample and the display position affect the positive operation probability of the data sample. Therefore, the positive operation probability of each data sample is corrected by using the uncertainty parameter of the positive operation probability and the user attention degree of each display position, so as to weaken impacts of the uncertainty of the positive operation probability of each data sample and each display position on the positive operation probability of the data sample may be separately weakened, thereby improving accuracy of the positive operation probability of each data sample.

For example, the application recommendation server may correct a positive operation probability $P_{(i,j)}$ of a data sample $X_{(i,j)}$ by using $P_{(i,j)}^{(l+1)} = P_{(i,j)} \times (uc_{(i,j)})^B$ and $$B = \sum_{l=1}^{T} b\{pos(j, l)\},$$

to obtain a corrected positive operation probability $P_{(i,j)}^{(l+1)}$ of $X_{(i,j)}$.

$uc_{(i,j)}$ is used to represent an uncertainty parameter of the positive operation probability $P_{(i,j)}$ of $X_{(i,j)}$; pos(j,l) is used to represent a display position at which the application program j is displayed for the $l^{th}$ time in the application recommendation interface; and b{pos(j,l)} is used to represent a user attention degree of the display position pos(j,l), $l \in \{1, 2, \ldots, T\}$, T is used to represent a quantity of times of displaying the application program j in the application recommendation interface, and $T \geq 1$.

Further, in this embodiment of the present invention, the application recommendation server may further sort, in a targeted manner based on corrected positive operation probabilities of all data samples corresponding to each user, application programs corresponding to all the data samples of the user. Specifically, S304 may include S304a and S304b.

Figure 7:
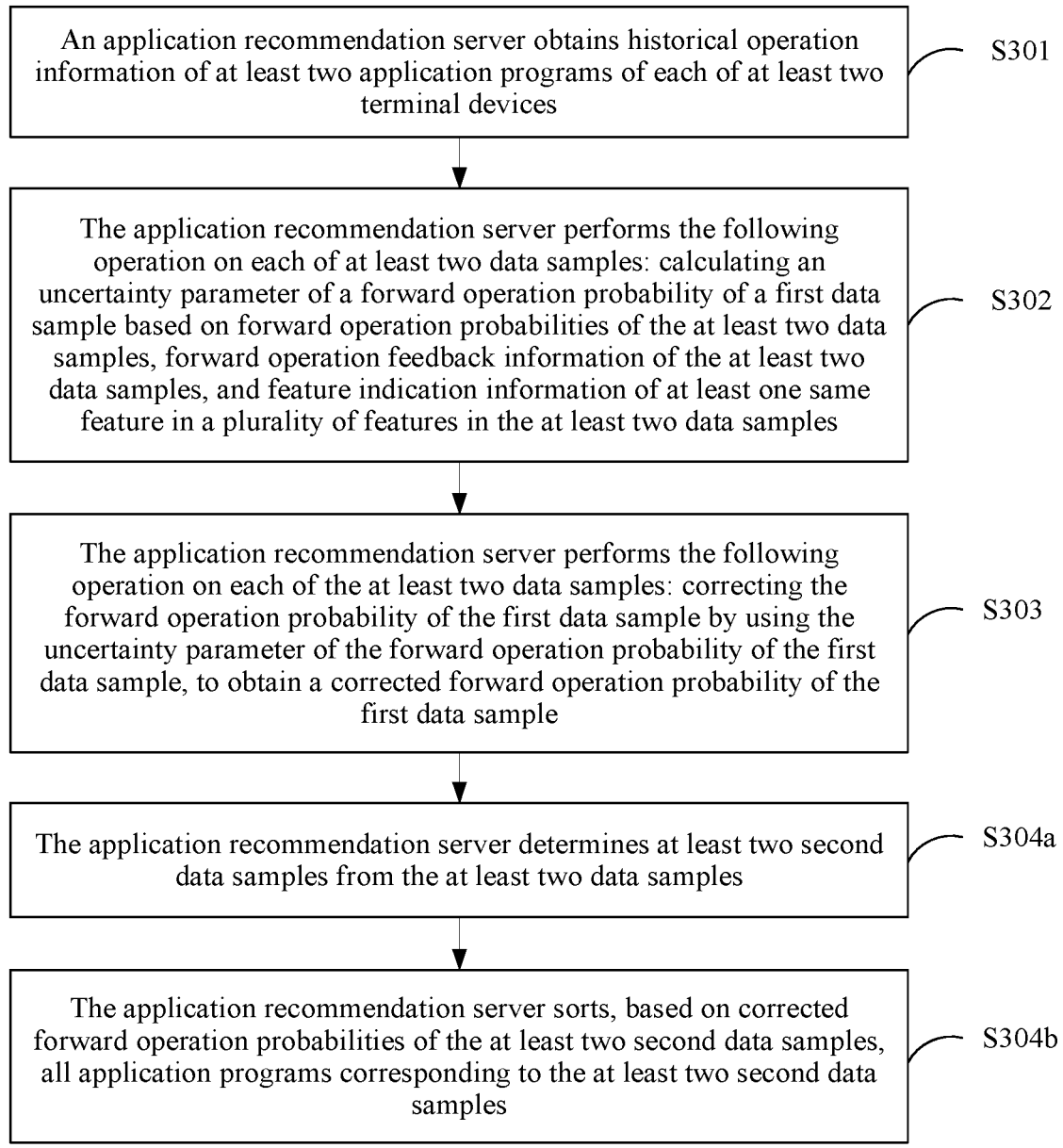
FIG. 7 is a flowchart 5 of an application program sorting method according to an embodiment of the present invention.
Figure 8:
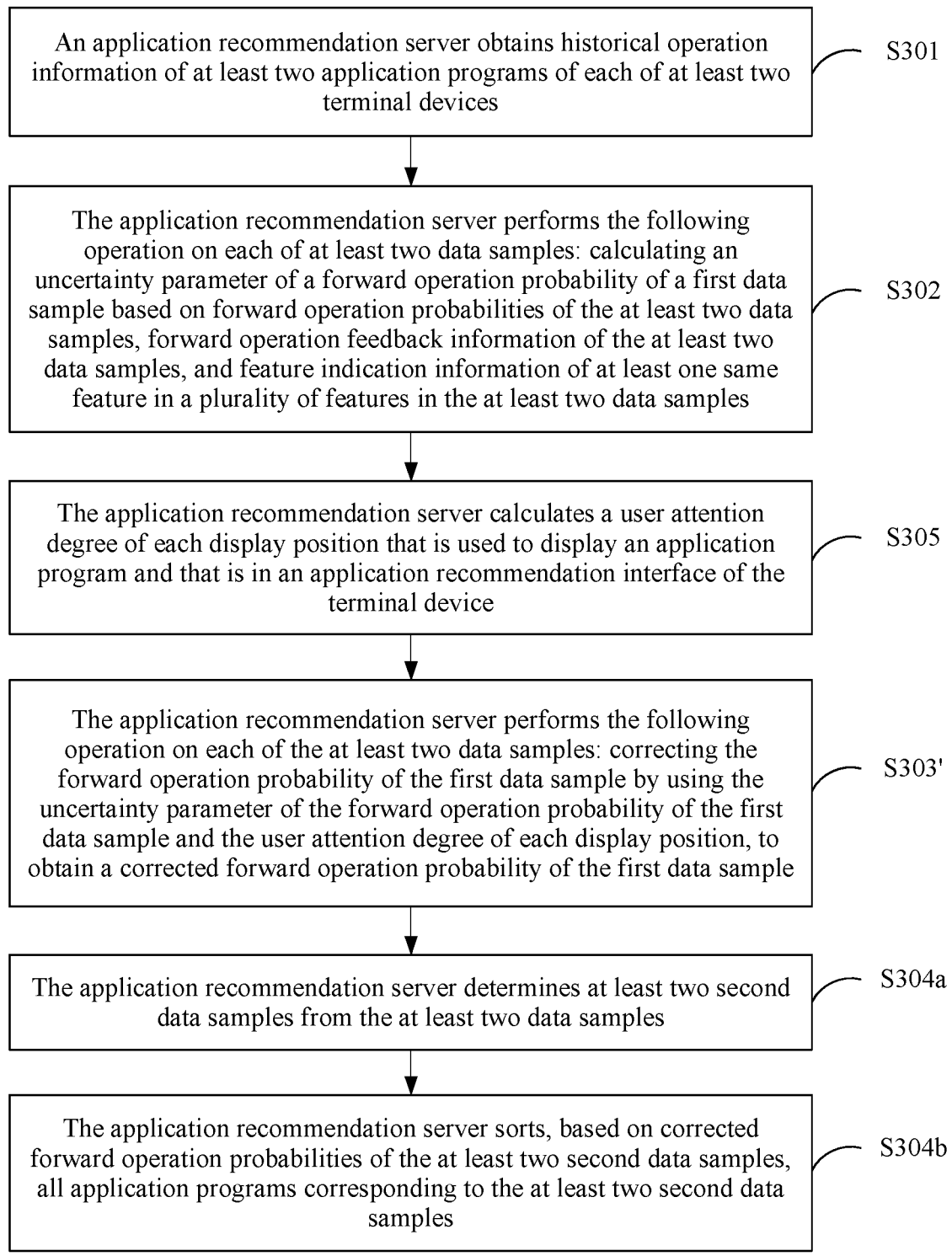
FIG. 8 is a flowchart 6 of an application program sorting method according to an embodiment of the present invention.

For example, as shown in FIG. 7, S304 in FIG. 3 may include S304a and S304b:

S304a: The application recommendation server determines at least two second data samples from the at least two data samples.

Each of the at least two second data samples corresponds to a first user and one application program.

For example, the at least two data samples provided in the foregoing embodiment may include data samples $X_{(1,1)}$, $X_{(1,2)}$, $X_{(1,3)}$, $X_{(2,1)}$, $X_{(2,2)}$, and $X_{(2,3)}$. The application recommendation server may determine, from the foregoing six data samples, the data samples $X_{(1,1)}$, $X_{(1,2)}$, and $X_{(1,3)}$ that correspond to a user 1 (i=1), and determine the data samples $X_{(2,1)}$, $X_{(2,2)}$, and $X_{(2,3)}$ that correspond to a user 2 (i=2). In this case, if the first user is the user 1, the at least two second data samples corresponding to the first user are the data samples $X_{(1,1)}$, $X_{(1,2)}$, and $X_{(1,3)}$.

S304b: The application recommendation server sorts, based on corrected positive operation probabilities of the at least two second data samples, all application programs corresponding to the at least two second data samples.

A sorting result obtained after the application recommendation server sorts all the application programs corresponding to the at least two second data samples is used to recommend, to the first user, all the application programs corresponding to the at least two second data samples.

For example, based on the foregoing embodiment, if the application recommendation server sorts application programs corresponding to the user 1 (i=1), the application recommendation server may sort an application program 1 whose identifier is an ID 1 and that corresponds to the data sample $X_{(1,1)}$, an application program 2 whose identifier is an ID 2 and that corresponds to the data sample $X_{(1,2)}$, and an application program 3 whose identifier is an ID 3 and that corresponds to the data sample $X_{(1,3)}$, and display (recommend), to the user 1 by using the application recommendation interface, a sorting result obtained after the application programs are sorted. Similarly, if the application recommendation server sorts application programs corresponding to the user 2 (i=2), the application recommendation server may sort an application program 1 whose identifier is an ID 1 and that corresponds to the data sample $X_{(2,1)}$, an application program 2 whose identifier is an ID 2 and that corresponds to the data sample $X_{(2,2)}$, and an application program 3 whose identifier is an ID 3 and that corresponds to the data sample $X_{(2,3)}$, and display (recommend), to the user 2 by using the application recommendation interface, a sorting result obtained after the application programs are sorted.

In the application program sorting method provided in this embodiment, the uncertainty parameter of the positive operation probability of each data sample may be calculated based on the positive operation probabilities of the at least two data samples, the positive operation feedback information of the at least two data samples, and the feature indication information of the at least one same feature in the plurality of features in the at least two data samples, and the positive operation probability of the data sample is then corrected by using the uncertainty parameter of each positive operation probability, to obtain the corrected positive operation probability of the data sample. Compared with the uncorrected positive operation probability, the corrected positive operation probability can more accurately reflect the possibility that the user performs a positive operation on the application program. Therefore, compared with an application program sorting result obtained after the application programs are sorted by using the uncorrected positive operation probabilities, an application program sorting result obtained after all the application programs corresponding to the at least two data samples are sorted based on the corrected positive operation probabilities of the at least two data samples can increase the possibility that the user performs a positive operation on the application program.

Further, in addition to the positive operation probability, factors affecting whether the user performs a positive operation on the application program may include the display position at which the application program is located in the application recommendation interface of the terminal device. Therefore, compared with the positive operation probability corrected based on only the uncertainty parameter of the positive operation probability of each data sample, the corrected positive operation probability of each data sample obtained by correcting the positive operation probability of the first data sample by using the uncertainty parameter of the positive operation probability of each data sample and the user attention degree of each display position can more accurately reflect the possibility that the user performs a positive operation on the application program. Therefore, herein in this embodiment of the present invention, compared with the application program sorting result obtained after the application programs are sorted based on only the corrected positive operation probability of the uncertainty parameter of the positive operation probability, the application program sorting result obtained after all the application programs corresponding to the at least two data samples are sorted based on the corrected positive operation probabilities of the at least two data samples may further increase the possibility that the user performs a positive operation on the application program.

The foregoing mainly describes the solutions provided in the disclosed embodiments from the perspective of interaction between network elements. It may be understood that to implement the foregoing functions, network elements such as the terminal device and the application recommendation server each include corresponding hardware structures and/or software modules for implementing the functions. It should be noted that the units and algorithm steps in the examples described with reference to the disclosed embodiments may be implemented by hardware or a combination of hardware and computer software. Whether the functions are performed by hardware or computer software driving hardware depends on particular applications and design constraint conditions of the technical solutions. Different methods to implement the described functions may be used for each particular application, but it should not be considered that the implementation goes beyond the scope of the embodiments.

In the disclosed embodiments, the application program sorting apparatus may be divided into one or more modules according to the method examples. For example, each module may be obtained through division for a corresponding function, or two or more functions may be integrated into one processing module. The integrated module may be implemented in a form of hardware, or may be implemented in a form of a software module. It should be noted that the module division in the embodiments is an example, and is merely logical function division. There may be another division manner in an actual implementation.

Figure 9:
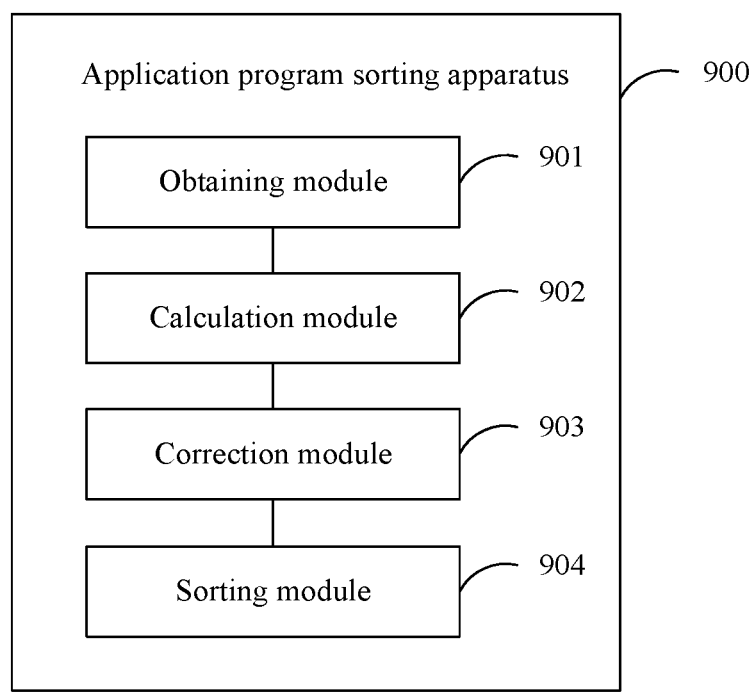
FIG. 9 is a schematic structural diagram 1 of an application program sorting apparatus according to an embodiment of the present invention.

FIG. 9 is a possible schematic structural diagram of an application program sorting apparatus according to the foregoing embodiment. The application program sorting apparatus may be an application recommendation server, or may be a terminal device on which software that can provide a service such as application program download is installed, or a CPU of the terminal device, or a control module that is on the terminal device and that is configured to sort application programs.

As shown in FIG. 9, the application program sorting apparatus 900 includes an obtaining module 901, a calculation module 902, a correction module 903, and a sorting module 904. The obtaining module 901 is configured to support the application program sorting apparatus 900 in performing S301, S301a, S301b, and S301c in the foregoing embodiment, and/or in performing another process of the technology described in this specification. The calculation module 902 is configured to support the application program sorting apparatus 900 in performing S302, S302a, S302b, and S305 in the foregoing embodiment, and/or in performing another process of the technology described in this specification. The correction module 903 is configured to support the application program sorting apparatus 900 in performing S303 and S303' in the foregoing embodiment, and/or in performing another process of the technology described in this specification. The sorting module 904 is configured to support the application program sorting apparatus 900 in performing S304, S304a, and S304b in the foregoing embodiment, and/or in performing another process of the technology described in this specification.

Figure 10:
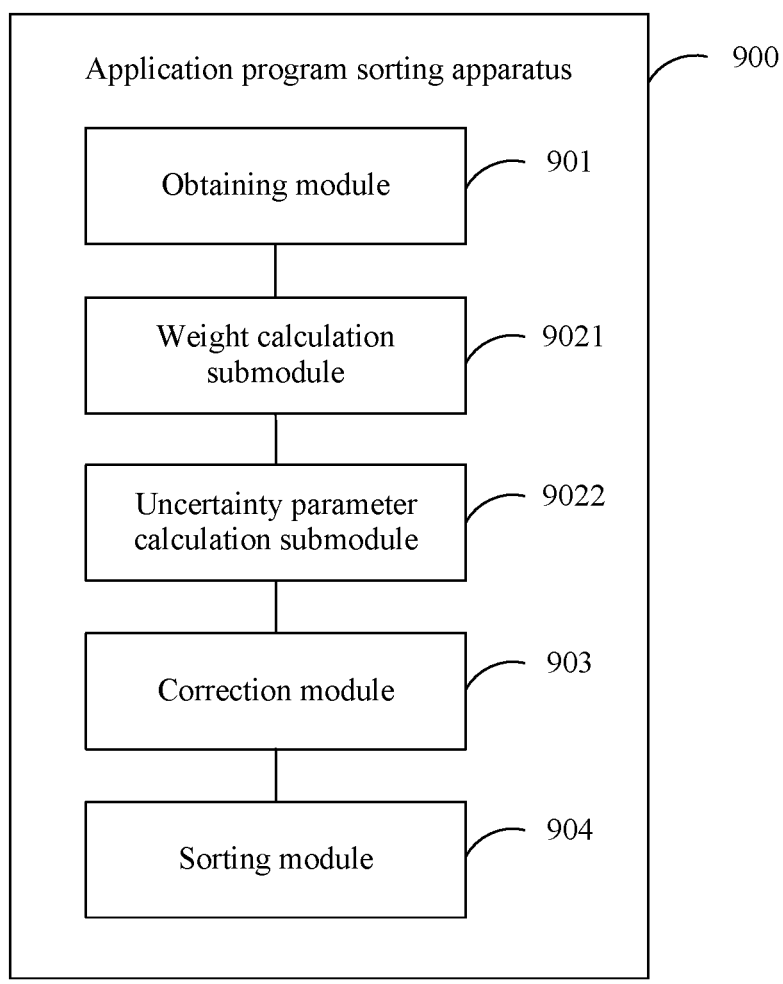
FIG. 10 is a schematic structural diagram 2 of an application program sorting apparatus according to an embodiment of the present invention.

Further, as shown in FIG. 10, the calculation module 902 of the application program sorting apparatus 900 in FIG. 9 further includes a weight calculation submodule 9021 and an uncertainty parameter calculation submodule 9022. The weight calculation submodule 9021 is configured to support the application program sorting apparatus 900 in performing S302a in the foregoing embodiment, and/or in performing another process of the technology described in this specification. The uncertainty parameter calculation submodule 9022 is configured to support the application program sorting apparatus 900 in performing S302b in the foregoing embodiment, and/or in performing another process of the technology described in this specification.

Certainly, the application program sorting apparatus provided in this embodiment of the present invention includes but is not limited to the foregoing function modules. For example, the application program sorting apparatus may further include a storage module. The storage module may be configured to store information that includes a positive operation probability of a data sample and a corrected positive operation probability of the data sample and that is obtained when the application program sorting apparatus performs an application program sorting method. The application program sorting apparatus may further include a communications interface. The communications interface may be configured to support the application program sorting apparatus in sending an application program sorting result to a terminal device, or may be configured to support the application program sorting apparatus in receiving information that is sent by a terminal device and that includes at least two data samples, positive operation feedback information of each of the at least two data samples, and the like. When the application program sorting apparatus is a terminal device on which software that can provide a service such as application program download is installed, the application program sorting apparatus may further include a display. The display may be configured to support the application program sorting apparatus in displaying a sorted application program.

When an integrated unit is used, the obtaining module 901, the calculation module 902, the correction module 903, the sorting module 904, and the like may be integrated into one processing module for implementation. The processing module may be a processor or a controller, for example, may be a CPU, a general-purpose processor, a Digital Signal Processor, (DSP), an Application-Specific Integrated Circuit (EASIC), a Field Programmable Gate Array (FPGA) or another programmable logic device, a transistor logic device, a hardware component, or any combination thereof. The processing module may implement or execute various example logical blocks, modules, and circuits that are described with reference to the content disclosed in the present invention. The processing module may also be a combination of computing functions, such as a combination of one or more microprocessors or a combination of a DSP and a microprocessor. The storage module may be a memory.

Figure 11:
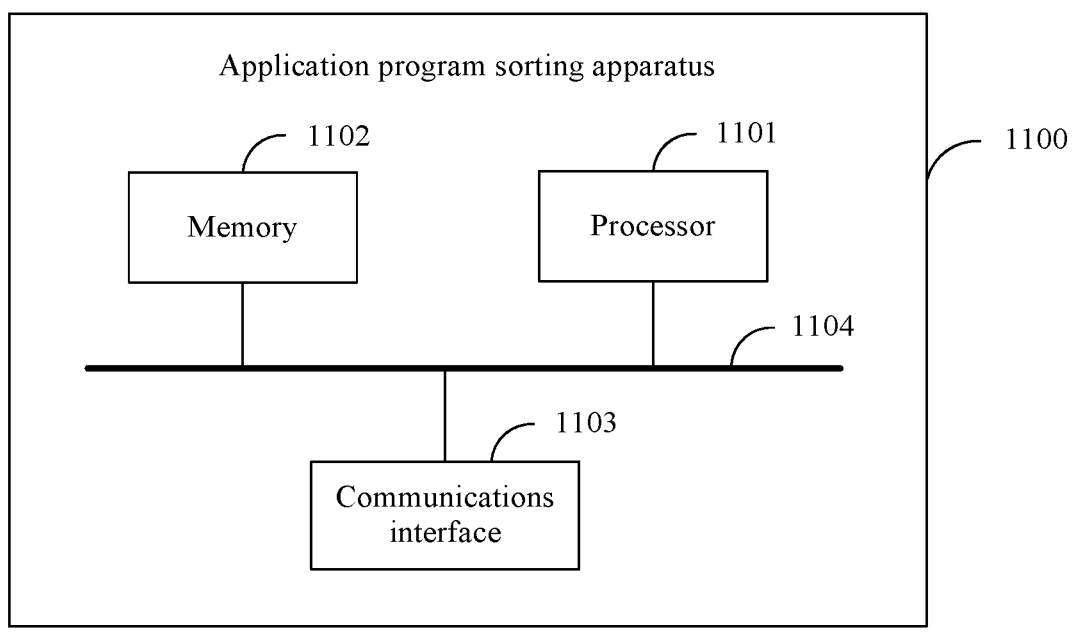
FIG. 11 is a schematic structural diagram 3 of an application program sorting apparatus according to an embodiment of the present invention.

When the processing module is a processor and the storage module is a memory, an embodiment of the present invention provides an application program sorting apparatus 1100 shown in FIG. 11 (the application program sorting apparatus 1100 may be an application recommendation server). As shown in FIG. 11, the application program sorting apparatus 1100 includes a processor 1101, a memory 1102, a communications interface 1103, and a bus 1104. The processor 1101, the memory 1102, and the communications interface 1103 are connected to each other by using the bus 1104. The bus 1104 may be a Peripheral Component Interconnect (PCI) bus, an Extended Industry Standard Architecture (EISA) bus, or the like. The bus 1104 may be categorized into an address bus, a data bus, a control bus, or the like. For ease of indication, the bus is indicated by using only one bold line in FIG. 11. However, it does not indicate that there is only one bus or only one type of bus.

An embodiment of the present invention further provides a computer storage medium. The computer storage medium stores computer program code. The computer program code includes an instruction. When the processor 1101 of the application program sorting apparatus 1100 executes the instruction, the application program sorting apparatus 1100 performs related method steps in the foregoing embodiment.

For detailed descriptions of the modules in the application program sorting apparatus 1100 provided in this embodiment of the present invention and technical effects brought after the modules perform related method steps in the foregoing embodiment, refer to related descriptions in the method embodiment. Details are not described herein.

The foregoing description provide an understanding for implementing the disclosed embodiments, and the division of the foregoing function modules is used as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and module, refer to a corresponding process in the foregoing method embodiments. Details are not described herein.

In the several embodiments, it should be understood that the disclosed system, apparatus, and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The function modules in the embodiments may be integrated into one processing module, or each unit may exist alone physically, or two or more modules are integrated into one unit. The integrated module may be implemented in a form of hardware, or may be implemented in a form of a software function module.

When the integrated module is implemented in the form of a software function module and sold or used as an independent product, the integrated module may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium, and includes several instructions for instructing a computer device (which may be a personal computer, a server, a network device, or the like) or a CPU to perform all or some of the steps in the application program sorting method in the embodiments of the present invention. The foregoing storage medium includes: any medium that can store program code, such as a USB flash drive, a removable hard disk, a Read-Only Memory (ROM), a Random Access Memory (RAM), a magnetic disk, or an optical disc.

The foregoing descriptions are merely specific embodiments, but are not intended to be limiting.

What is claimed is:

1. An application sorting method, comprising:
obtaining a positive operation probability and positive operation feedback information of each of at least two data samples, wherein one data sample in the at least two data samples corresponds to a user and an application program, the one data sample comprises feature indication information of a plurality of features, the plurality of features in the one data sample are respectively the same as a plurality of features in another data sample, the another data sample is any of the at least two data samples except the one data sample, the positive operation probability of the at least two data samples is a probability that the user performs a positive operation on the application program in a preset time period, and the positive operation feedback information of the at least two data samples is used to indicate whether the user has performed a positive operation on the application in the preset time period;
calculating an uncertainty parameter of a positive operation probability of a first data sample based on the positive operation probabilities of the at least two data samples, the positive operation feedback information of the at least two data samples, and feature indication information of at least one same feature in a plurality of features in the at least two data samples;
correcting the positive operation probability of the first data sample by using the uncertainty parameter of the positive operation probability of the first data sample, to obtain a corrected positive operation probability of the first data sample, wherein the first data sample is any of the at least two data samples; and
sorting, based on positive operation probabilities of the at least two data samples which comprise corrected positive operation probability of the first data sample, application programs corresponding to the at least two data samples.

2. The method according to claim 1, further comprising:
calculating a user attention degree of different display positions that are used to display an application and that are in an application recommendation interface of a terminal device, wherein the user attention degree is used to represent a possibility that the user performs a positive operation on the application program displayed at the display position.

3. The method according to claim 2, further comprising:
correcting the positive operation probability of the first data sample by using the uncertainty parameter of the positive operation probability of the first data sample and the user attention degrees of the different display positions, to obtain the corrected positive operation probability of the first data sample.

4. The method according to claim 1, further comprising:
calculating a weight of a first same feature based on the positive operation probabilities of the at least two data samples, the positive operation feedback information of the at least two data samples, and feature indication information of the first same feature in each of the at least two data samples, wherein the first same feature is any of the at least one same feature; and calculating the uncertainty parameter of the positive operation probability of the first data sample based on a weight of the at least one same feature and the feature indication information of the at least one same feature comprised in the first data sample.

5. The method according to claim 4, wherein the at least one same feature comprises each feature in the at least two data samples; and wherein the calculating the uncertainty parameter further comprises:

calculating a weight $n_k$ of a $k^{th}$ same feature in the at least two data samples by using $$n_k = \sum_{j=1}^{n} \sum_{i=1}^{m} ((P_{(i,j)} - y_{(i,j)}) \times a_{(i,j)-k})^2,$$

wherein $k \in \{1, 2, \ldots, q\}$, q is used to represent a quantity of features in $X_{(i,j)}$, and $q \geq 3$, wherein $X_{(i,j)}$ is used to represent a data sample corresponding to a user i and an application j, $i \in \{1,2,\ldots,m\}$, m is used to represent a quantity of users, $m \geq 2$, $j \in \{1,2,\ldots n\}$, n is used to represent a quantity of application programs, and $n \geq 2$; $P_{(i,j)}$ is used to represent a positive operation probability of $X_{(i,j)}$, and $y_{(i,j)}$ is used to represent positive operation feedback information of $X_{(i,j)}$; and $a_{(i,j)-k}$ is used to represent feature indication information of the $k^{th}$ same feature $x_{(i,j)-k}$ in $X_{(i,j)}$.

6. The method according to claim 4, wherein the at least one same feature comprises each feature in the at least two data samples; and wherein the calculating the uncertainty parameter further comprises:

calculating an uncertainty parameter $uc_{(i,j)}$ of the positive operation probability of the data sample $X_{(i,j)}$ by using $$uc_{(i,j)} = \sum_{k=1}^{q} \frac{a_{(i,j)-k}}{\sqrt{n_k}},$$

wherein the first data sample is the data sample $X_{(i,j)}$ of the user i and the application j, $i \in \{1, 2, \ldots, m\}$, m is used to represent a quantity of users, $m \geq 2$, $j \in \{1,2,\ldots, n\}$ is used to represent the quantity of application programs, and $n \geq 2$; $k \in \{1,2,\ldots, n\}$ q is used to represent the quantity of features in $X_{(i,j)}$, and $q \geq 3$; $n_k$ is used to represent the weight of the $k^{th}$ same feature in $X_{(i,j)}$; and $a_{(i,j)-k}$ is used to represent the feature indication information of the $k^{th}$ same feature $x_{(i,j)-k}$ in $X_{(i,j)}$.

7. The method according to claim 1, wherein the correcting the positive operation probability of the first data sample further comprises:

correcting the positive operation probability $P_{(i,j)}$ of the data sample $X_{(i,j)}$ by using $P_{(i,j)}^{1}=P_{(i,j)} \times uc_{(i,j)}$, to obtain a corrected positive operation probability $P_{(i,j)}^{1}$ of $X_{(i,j)}$, wherein the first data sample is the data sample $X_{(i,j)}$ of the user i and the application j, $i \in \{1,2,\ldots,m\}$, m is used to represent a quantity of users, $m \geq 2$, $j \in \{1, 2, \ldots, n\}$, n is used to represent the quantity of application programs, and $n \geq 2$; and $uc_{(i,j)}$ is used to represent the uncertainty parameter of the positive operation probability $P_{(i,j)}$ of $X_{(i,j)}$.

8. The method according to claim 2, wherein the correcting the positive operation probability of the first data sample further comprises:

correcting a positive operation probability $P_{(i,j)}$ of a data sample $X_{(i,j)}$ by using $P_{(i,j)}^{(l+1)}=P_{(i,j)} \times (uc_{(i,j)})^{B}$ $$B = \sum_{l=1}^{T} b\{pos(j, l)\},$$

to obtain a corrected positive operation probability $P_{(i,j)}^{l+1}$ of $X_{(i,j)}$, wherein the first data sample is the data sample $X_{(i,j)}$ of a user i and an application j, $i \in \{1,2,\ldots,m\}$, m is used to represent a quantity of users, $m \geq 2$, $j \in \{1,2,\ldots,n\}$, n is used to represent a quantity of application programs, and $n \geq 2$; $uc_{(i,j)}$ is used to represent an uncertainty parameter of the positive operation probability $P_{(i,j)}$ of $X_{(i,j)}$; pos(j,l) is used to represent a display position at which the application j is displayed for the $l^{th}$ time in the application recommendation interface; and $b\{pos(j,l)\}$ is used to represent a user attention degree of the display position $pos(j,l)$, $l \in \{1, 2, \ldots, T\}$, T is used to represent a quantity of times of displaying the application j in the application recommendation interface, and $T \geq 1$.

9. The method according to claim 7, wherein the sorting, based on corrected positive operation probabilities of the at least two data samples, application programs corresponding to the at least two data samples further comprises:

determining at least two second data samples from the at least two data samples, wherein each of the at least two second data samples corresponds to a first user and an application program; and sorting, based on corrected positive operation probabilities of the at least two second data samples, each application program corresponding to the at least two second data samples, wherein a sorting result obtained after each application program corresponding to the at least two second data samples are sorted is used to recommend, to the first user, each application program corresponding to the at least two second data samples.

10. An application sorting apparatus comprising:

a processor; and a memory coupled to the processor and configured to store a plurality of instructions that, when executed, causes the processor to obtain a positive operation probability and positive operation feedback information of each of at least two data samples, wherein one data sample in the at least two data samples corresponds to a user and an application program, the one data sample comprises feature indication information of a plurality of features, the plurality of features in the one data sample are respectively the same as a plurality of features in another data sample, the another data sample is any of the at least two data samples except the one data sample, the positive operation probability of the data sample is a probability that the user performs a positive operation on the application program in a preset time period, and the positive operation feedback information of the at least two data samples is used to indicate whether the user has performed a positive operation on the application program in the preset time period, calculate an uncertainty parameter of a positive operation probability of a first data sample based on the positive operation probabilities of the at least two data samples, the positive operation feedback information of the at least two data samples, and feature indication information of at least one same feature in a plurality of features in the at least two data samples, correct the positive operation probability of the first data sample by using the uncertainty parameter of the positive operation probability of the first data sample, to obtain a corrected positive operation probability of the first data sample, wherein the first data sample is any one of the at least two data samples, and sort, based on positive operation probabilities of the at least two data samples which comprise corrected positive operation probability of the first data sample, application programs corresponding to the at least two data samples.

11. The apparatus according to claim 10, wherein the processor is to:

calculate a user attention degree of different display positions that are used to display the application program and that are in an application recommendation interface of a terminal device, wherein the user attention degree is used to represent a possibility that the user performs a positive operation on the application program displayed at the display position.

12. The apparatus according to claim 11, wherein the processor is to:

correct the positive operation probability of the first data sample by using the uncertainty parameter of the positive operation probability of the first data sample and the user attention degrees of the different display positions, to obtain the corrected positive operation probability of the first data sample.

13. The apparatus according to claim 10, wherein the processor is to:

calculate calculating a weight of a first same feature based on the positive operation probabilities of the at least two data samples, the positive operation feedback information of the at least two data samples, and feature indication information of the first same feature in each of the at least two data samples, wherein the first same feature is any one of the at least one same feature; and calculate the uncertainty parameter of the positive operation probability of the first data sample based on a weight of the at least one same feature and the feature indication information of the at least one same feature comprised in the first data sample.

14. The apparatus according to claim 10, further comprising:

correcting the positive operation probability $P_{(i,j)}$ of the data sample $X_{(i,j)}$ by using $P_{(i,j)}^1 = P_{(i,j)} \times uc_{(i,j)}$, to obtain a corrected positive operation probability $P_{(i,j)}^1$ of $X_{(i,j)}$, wherein the first data sample is the data sample $X_{(i,j)}$ of the user i and the application j, $i \in \{1,2,\ldots,m\}$, m is used to represent a quantity of users, $m \geq 2$, $j \in \{1, 2, \ldots, n\}$, n is used to represent the quantity of application programs, and $n \geq 2$; and $uc_{(i,j)}$ is used to represent the uncertainty parameter of the positive operation probability $P_{(i,j)}$ of $X_{(i,j)}$.

15. A non-transitory computer-readable storage medium comprising instructions which, when executed by a computer, cause the computer to perform an operation comprising:

obtaining a positive operation probability and positive operation feedback information of each of at least two data samples, wherein one data sample in the at least two data samples corresponds to a user and an application program, the one data sample comprises feature indication information of a plurality of features, the plurality of features in the one data sample are respectively the same as a plurality of features in another data sample, the another data sample is any of the at least two data samples except the one data sample, the positive operation probability of the at least two data samples is a probability that the user performs a positive operation on the application program in a preset time period, and the positive operation feedback information of the at least two data samples is used to indicate whether the user has performed a positive operation on the application program in the preset time period;

calculating an uncertainty parameter of a positive operation probability of a first data sample based on the positive operation probabilities of the at least two data samples, the positive operation feedback information of the at least two data samples, and feature indication information of at least one same feature in a plurality of features in the at least two data samples;

correcting the positive operation probability of the first data sample by using the uncertainty parameter of the positive operation probability of the first data sample, to obtain a corrected positive operation probability of the first data sample, wherein the first data sample is any one of the at least two data samples; and sorting, based on positive operation probabilities of the at least two data samples which comprise corrected positive operation probability of the first data sample, application programs corresponding to the at least two data samples.

16. The non-transitory computer-readable storage medium according to claim 15, wherein the computer is to perform an operation comprising:

calculating a user attention degree of different display positions that are used to display the application program and that are in an application recommendation interface of a terminal device, wherein the user attention degree is used to represent a possibility that the user performs a positive operation on the application program displayed at the display position.

17. The non-transitory computer-readable storage medium according to claim 16, wherein the computer is to perform an operation comprising:

correcting the positive operation probability of the first data sample by using the uncertainty parameter of the positive operation probability of the first data sample and the user attention degrees of the different display positions, to obtain the corrected positive operation probability of the first data sample.

18. The non-transitory computer-readable storage medium according to claim 15, wherein the computer is to perform an operation comprising:

calculating a weight of a first same feature based on the positive operation probabilities of the at least two data samples, the positive operation feedback information of the at least two data samples, and feature indication information of the first same feature in each of the at least two data samples, wherein the first same feature is any one of the at least one same feature; and calculating the uncertainty parameter of the positive operation probability of the first data sample based on a weight of the at least one same feature and the feature indication information of the at least one same feature comprised in the first data sample.

19. The non-transitory computer-readable storage medium according to claim 15, wherein the computer is to perform an operation comprising:

correcting the positive operation probability $P_{(i,j)}$ of the data sample $X_{(i,j)}$ by using $P_{(i,j)}^1 = P_{(i,j)} \times uc_{(i,j)}$, to obtain a corrected positive operation probability $P_{(i,j)}^1$ of $X_{(i,j)}$, wherein the first data sample is the data sample $X_{(i,j)}$ of the user i and the application j, $i \in \{1,2,\ldots,m\}$, m is used to represent a quantity of users, $m \geq 2$, $j \in \{1, 2, \ldots, n\}$, n is used to represent the quantity of application programs, and $n \geq 2$; and $uc_{(i,j)}$ is used to represent the uncertainty parameter of the positive operation probability $P_{(i,j)}$ of $X_{(i,j)}$.

\* \* \* \* \*